US012668023B2

(12) United States Patent
Man et al.

(10) Patent No.:  US 12,668,023 B2
(45) Date of Patent:      Jun. 30, 2026

(54) METHODS OF OPERATING ELECTROCHEMICAL-ADDITIVE MANUFACTURING SYSTEMS COMPRISING MODULAR CARTRIDGE ASSEMBLIES

(71) Applicant: Fabric8Labs, Inc., San Diego, CA (US)

(72) Inventors: Michelle Man, San Diego, CA (US); Sean Stone, San Diego, CA (US); Andrew Edmonds, Oceanside, CA (US); Michael Korody, Poway, CA (US); Paul Doyon, San Diego, CA (US)

(73) Assignee: Fabric8Labs, Inc., San Diego, CA (US)

( * ) Notice:   Subject to any disclaimer, the term of this patent is extended or adjusted under 35 U.S.C. 154(b) by 195 days.

(21) Appl. No.: 18/790,020

(22) Filed:   Jul. 31, 2024

(65) Prior Publication Data

US 2026/0034727 A1    Feb. 5, 2026

(51) Int. Cl.
B23P 19/02        (2006.01)
B23P 19/04        (2006.01)
(Continued)

(52) U.S. Cl.
CPC .......... B29C 64/264 (2017.08); B29C 64/209 (2017.08); B29C 65/565 (2013.01); C25D 1/003 (2013.01); B33Y 10/00 (2014.12)

(58) Field of Classification Search
CPC ........ B23P 19/02; B23P 19/04; B29C 64/124; B29C 64/129; B29C 64/386; B29C 65/56;
(Continued)

(56) References Cited

U.S. PATENT DOCUMENTS 4,575,330  A    3/1986  Hull
4,678,282  A    7/1987  Yaniv et al.
(Continued)

FOREIGN PATENT DOCUMENTS

CN        204097583  U    1/2015
CN        104593830  A    5/2015
(Continued)

OTHER PUBLICATIONS

Frey et al., "Switch-matrix-based High-Density Microelectrode Array in CMOS Technology" Article in IEEE Journal of Solid-State Circuits Mar. 2010.
(Continued)

*Primary Examiner* — Leo B Tentoni
(74) *Attorney, Agent, or Firm* — Polygon IP, LLP

(57)        ABSTRACT

Described herein are methods of operating ECAM systems comprising modular cartridge assemblies. A modular cartridge assembly comprises a base, a cover, an ECAM printhead, a support unit, and a control board. The base has an opening providing access to the support unit (e.g., for heat transfer and fluidic connections), which is sealed against the base around this opening. The cover also has an opening exposing the electrode array of the ECAM printhead. The ECAM printhead is also sealed against the cover around this opening. The control board selectively activates the electrode of the array and is positioned within a cavity formed by the base and cover. The modular cartridge assembly allows replacing the ECAM printhead when the electrode array is damaged (e.g., dissolved during the ECAM process), while other assembly components can be reused. Furthermore, the support unit provides alignment and heat transfer for the ECAM printhead.

25 Claims, 18 Drawing Sheets

(51) Int. Cl.

| | |
|---|---|
| *B29C 64/129* | (2017.01) |
| *B29C 64/209* | (2017.01) |
| *B29C 64/264* | (2017.01) |
| *B29C 65/56* | (2006.01) |
| *C25D 1/00* | (2006.01) |
| *B33Y 10/00* | (2015.01) |

(58) Field of Classification Search
CPC ....... B29C 65/565; B33Y 10/00; B33Y 50/00;
C25D 1/00; C25D 1/003
USPC ......... 264/40.1, 308, 401, 449, 451; 205/67;
29/525, 525.01, 527.1, 592.1, 825
See application file for complete search history.

(56) References Cited

U.S. PATENT DOCUMENTS

| | | | |
|---|---|---|---|
| 5,132,820 | A | 7/1992 | Someya et al. |
| 5,403,460 | A | 4/1995 | Sala et al. |
| 5,641,391 | A | 6/1997 | Hunter et al. |
| 5,998,805 | A | 12/1999 | Shi et al. |
| 6,036,834 | A | 3/2000 | Clerc |
| 7,839,831 | B2 | 11/2010 | Vrcelj et al. |
| 8,168,540 | B1 | 5/2012 | Reid et al. |
| 8,681,077 | B2 | 3/2014 | Kimura |
| 9,777,385 | B2 | 10/2017 | Wirth et al. |
| 10,465,307 | B2 | 11/2019 | Pain et al. |
| 10,724,146 | B1 | 7/2020 | Pain et al. |
| 10,914,000 | B1 | 2/2021 | Pain et al. |
| 10,947,632 | B1 | 3/2021 | Pain et al. |
| 11,232,956 | B2 | 1/2022 | Pain et al. |
| 11,313,035 | B2 | 4/2022 | Pain et al. |
| 11,313,036 | B2 | 4/2022 | Pain et al. |
| 11,401,603 | B2 | 8/2022 | Pain et al. |
| 2001/0014409 | A1 | 8/2001 | Cohen |
| 2003/0006133 | A1 | 1/2003 | Metzger |
| 2004/0129573 | A1 | 7/2004 | Cohen |
| 2005/0045252 | A1 | 3/2005 | Yamasaki et al. |
| 2005/0176238 | A1 | 8/2005 | Cohen et al. |
| 2005/0183959 | A1 | 8/2005 | Wilson et al. |
| 2005/0202660 | A1 | 9/2005 | Cohen et al. |
| 2005/0223543 | A1 | 10/2005 | Cohen et al. |
| 2006/0283539 | A1 | 12/2006 | Slafer |
| 2007/0068819 | A1 | 3/2007 | Singh et al. |
| 2007/0089993 | A1 | 4/2007 | Schwartz et al. |
| 2007/0221504 | A1 | 9/2007 | Luo |
| 2010/0300886 | A1 | 12/2010 | Lin et al. |
| 2011/0210005 | A1 | 9/2011 | Bossche et al. |
| 2017/0145584 | A1 | 5/2017 | Wirth et al. |
| 2019/0160594 | A1 | 5/2019 | Flamm et al. |
| 2021/0047744 | A1 | 2/2021 | Biton |
| 2023/0089135 | A1 | 3/2023 | Pain et al. |

FOREIGN PATENT DOCUMENTS

| | | |
|---|---|---|
| CN | 104178782 A | 12/2016 |
| WO | 2017087884 A1 | 5/2017 |
| WO | 2019150362 A1 | 8/2019 |
| WO | 2021041265 A1 | 3/2021 |

OTHER PUBLICATIONS

International Search Report and Written Opinion for PCT/US2020/047531 dated Sep. 29, 2020.
Nakamura et al., Incorporation of input function into displays using LTPS TFT technology, Journal of the SID 14/4, 2006.
Stewart et al., "Polysilicon TFT Technology for Active Matrix OLEO Displays", IEEE Transactions on B..Ectron Devices. vol. -18. No. 5. May 2001.
Supplementary International Search Report for PCT/US2020/047531 dated Nov. 22, 2021.
U.S. Appl. No. 17/535,437, filed Nov. 24, 2021.
U.S. Appl. No. 17/566,546, filed Dec. 30, 2021.

Electrolyte Solution 180

Salt 182

Cations 183

Anions 184

Electrolyte Solution Solvent (e.g., Water) 186

Conductive Agent 188

*Top View*

200

400

409

500

*Bottom View*

Bottom View

*Top View*

*Bottom View*

Cross-section: C-C

*Top View – First Example*

*Top View – Second Example*

Top View

Bottom View

METHODS OF OPERATING ELECTROCHEMICAL-ADDITIVE MANUFACTURING SYSTEMS COMPRISING MODULAR CARTRIDGE ASSEMBLIES

BACKGROUND

Additive manufacturing, also known as 3-dimensional (3D) printing, is often used to produce complex parts using a layer-by-layer deposition process on substrates. Additive manufacturing can utilize a variety of processes in which various materials (e.g., plastics, liquids, and/or powders) are deposited, joined, and/or solidified. Some examples of techniques used for additive manufacturing include vat photopolymerization, material jetting, binder jetting, powder bed fusion (e.g., using selective laser melting or electron beam melting), material extrusion, directed energy deposition, and sheet lamination. However, metal additive manufacturing has been limited due to the high cost associated with selective laser melting and electron beam melting systems. Furthermore, thermal fusing produces parts with rough surface finishes because the unmelted metal powder is often sintered to the outer edges of the finished product. Electrochemical-additive manufacturing (ECAM) provides many new options not available with conventional additive manufacturing techniques.

SUMMARY

Described herein are methods of operating ECAM systems comprising modular cartridge assemblies. A modular cartridge assembly may comprise a base, a cover, an ECAM printhead, a support unit, and a control board. The base has an opening providing access to the support unit (e.g., for heat transfer and fluidic connections), which is sealed against the base around this opening. The cover also has an opening exposing the electrode array of the ECAM printhead. The ECAM printhead is also sealed against the cover around this opening. The control board selectively activates the electrode of the array and is positioned within a cavity formed by the base and cover. The modular cartridge assembly allows replacing the ECAM printhead when the electrode array is damaged (e.g., during the ECAM process), while other assembly components can be reused. Furthermore, the support unit provides alignment and heat transfer for the ECAM printhead.

Clause 1. A modular cartridge assembly for electrochemical additive manufacturing (ECAM), the modular cartridge assembly comprising: a base comprising a base opening, a base recess support positioned within the base opening, a base recessed support groove provided within the base recess support, and a base recessed support gasket at least partially extending into the base recessed support groove; a cover comprising a cover opening, a cover opening groove surrounding the cover opening, and a cover opening gasket at least partially extending into the cover opening groove, wherein the cover is attached to and sealed against the base; an ECAM printhead defined by a first printhead side and a second printhead side opposite to the first printhead side, wherein: the ECAM printhead comprises, on the first printhead side, an electrode array and an edge portion surrounding the electrode array, the edge portion is sealed against the cover opening gasket of the cover, and the electrode array is aligned with and exposed through the cover opening; a support unit directly interfacing the second printhead side and sealed against the base recessed support gasket, wherein the base, the cover, the ECAM printhead, and the support unit collectively form a sealed assembly cavity; a busbar comprising a busbar external connector and a busbar main portion, wherein: the busbar external connector protrudes through and is sealed against the base, and the busbar main portion is electrically coupled to the ECAM printhead and is positioned within the sealed assembly cavity, and is configured to deliver current to the ECAM printhead; and a control board comprising a control board external connector and a control board main portion, wherein: the control board external connector protrudes through and is sealed against the base, and the control board main portion is electrically coupled to the ECAM printhead and is positioned within the sealed assembly cavity, and is configured to selectively activate a subset of electrodes in the electrode array.

Clause 2. The modular cartridge assembly of clause 1, wherein the control board further comprises a processor configured for mapping using the ECAM printhead during operation of the modular cartridge assembly.

Clause 3. The modular cartridge assembly of clause 2, wherein the control board further comprises a control board power connector configured for the mapping using an auxiliary power connection independent of the busbar.

Clause 4. The modular cartridge assembly of clause 2, wherein the control board further comprises a sensor configured for mapping using the ECAM printhead during operation of the modular cartridge assembly.

Clause 5. The modular cartridge assembly of clause 1, wherein: the base comprises a base outer edge defining an outer-most boundary of the base and comprising a base edge groove, the base further comprises a base edge gasket at least partially extending into the base edge groove, the cover comprises an interior side wall defining a cover open cavity that extends to the cover opening, and the base at least partially extends into the cover open cavity such that the base edge gasket forms a seal with the interior side wall.

Clause 6. The modular cartridge assembly of clause 1, wherein: the base comprises a set of base attachment openings extending through the base and forming a base attachment opening sidewall, the cover comprises a set of cover attachment protrusions, each comprising a cover attachment protrusion groove and a cover attachment protrusion gasket at least partially extending into the cover attachment protrusion groove, and the set of cover attachment protrusions extends into the set of base attachment openings such that the cover attachment protrusion gasket is sealed against the base attachment opening sidewall.

Clause 7. The modular cartridge assembly of clause 1, wherein: the cover comprises a set of electrolyte delivery slots and a set of electrolyte delivery connectors, positioned away from the cover opening and fluidically coupled to the set of electrolyte delivery slots, and the set of electrolyte delivery slots is positioned proximate to the cover opening and configured to uniformly distribute electrolyte to the first printhead side, exposed through the cover opening, and to collect the electrolyte from the first printhead side.

Clause 8. The modular cartridge assembly of clause 1, wherein: the ECAM printhead comprises, on the first printhead side, electrode-array drivers positioned on the edge portion and electrically connected to each electrode in the electrode array, connected to the control board, and also connected to the busbar, and the electrode-array drivers are configured to select the subset of electrodes in the electrode array for receiving the current based on a signal received from the control board.

Clause 9. The modular cartridge assembly of clause 8, wherein the modular cartridge assembly further comprises a set of flexible ribbon cables interconnecting the electrode-array drivers with the control board.

Clause 10. The modular cartridge assembly of clause 9, wherein the ECAM printhead comprises flexible ribbon cable connectors, each connected to a corresponding cable in the set of flexible ribbon cables.

Clause 11. The modular cartridge assembly of clause 9, wherein the set of flexible ribbon cables and the electrode-array drivers are positioned within the sealed assembly cavity.

Clause 12. The modular cartridge assembly of clause 1, wherein the ECAM printhead comprises a glass base forming the second printhead side and is thermally coupled to the support unit.

Clause 13. The modular cartridge assembly of clause 1, wherein: the ECAM printhead comprises printhead aligning features aligned relative to the support unit, thereby aligning the electrode array relative to the support unit.

Clause 14. The modular cartridge assembly of clause 1, wherein: the cover comprises cover-aligning features, aligned to the busbar, thereby aligning the busbar relative to the cover opening.

Clause 15. The modular cartridge assembly of clause 1, wherein: the support unit comprises a support-unit first side and a support-unit second side, opposite of the support-unit first side, the support-unit first side directly interfaces the second printhead side, and the support-unit first side and the support-unit first side are substantially parallel to each other.

Clause 16. The modular cartridge assembly of clause 15, wherein the support unit further comprises a support unit primary opening extending through the support unit between the support-unit first side and the support-unit second side and fluidically coupled to the sealed assembly cavity.

Clause 17. The modular cartridge assembly of clause 16, wherein the support unit further comprises a support unit leak detection opening extending through the support unit between the support-unit first side and the support-unit second side and fluidically coupled to the sealed assembly cavity.

Clause 18. The modular cartridge assembly of clause 17, wherein the support unit further comprises a support-unit leak-detection groove on the support-unit first side, and wherein the support-unit leak-detection groove extends between the support unit leak detection opening and an edge of the support unit.

Clause 19. The modular cartridge assembly of clause 1, wherein the control board main portion is configured to selectively activate a subset of electrodes in the electrode array.

Clause 20. The modular cartridge assembly of clause 19, wherein the control board comprises various one or more interface processors for controlling one or more operations of the ECAM printhead.

Clause 21. The modular cartridge assembly of clause 1, wherein the busbar comprises a set of spring contacts extending away from the busbar main portion and compressibly engaging the control board, and wherein the set of spring contacts are electrically coupled to the external connector.

Clause 22. The modular cartridge assembly of clause 21, wherein the set of spring contacts comprises one or more contacts selected from the group consisting of a leaf spring, a pogo pin, and a flexible conductive gasket.

Clause 23. The modular cartridge assembly of clause 1, wherein the cover opening gasket conforms to the cover opening groove in an uncompressed state.

Clause 24. A method for electrochemical additive manufacturing, the method comprising: assembling a modular cartridge assembly comprising a base, a cover, an ECAM printhead comprising an electrode array, a support unit, a control board external connector, and a busbar external connector; positioning the modular cartridge assembly on a modular-cartridge-assembly support comprising an assembly support thermal plate, an assembly support signal connector, and an assembly support power connector, wherein, after positioning the modular cartridge assembly on the modular-cartridge-assembly support: the assembly support signal connector is connected to the control board external connector, the assembly support power connector is connected to the busbar external connector, and the assembly support thermal plate directly interfaces and is sealed against the support unit; reducing pressure within a sealed assembly cavity collectively formed by the base, the cover, the ECAM printhead, and the support unit thereby forcing the ECAM printhead against the support unit and also forcing the support unit against the assembly support thermal plate; and performing the electrochemical additive manufacturing by: providing an electrolyte solution between and in contact with the electrode array of the ECAM printhead and a cathode, delivering a current to a subset of electrodes in the electrode array, and depositing a material from electrolyte onto a portion of the cathode aligned with the subset of electrodes in the electrode array.

Clause 25. The method of clause 24, further comprising mapping the electrode array thereby generating a current map, wherein the current map is used as feedback for delivering the current to the subset of electrodes in the electrode array.

Clause 26. The method of clause 25, wherein: the modular cartridge assembly further comprises a control board such that the control board external connector is a part of the control board, and the control board comprises a processor performing mapping of the electrode array.

Clause 27. The method of clause 26, wherein: the control board further comprises a control board power connector, mapping the electrode array comprises flowing a current through the control board power connector.

Clause 28. The method of clause 25, wherein mapping the electrode array comprises flowing a current through the control board external connector.

Clause 29. The method of clause 25, wherein the busbar external connector is disconnected from the power supply while mapping the electrode array.

Clause 30. The method of clause 24, wherein the base comprises a base opening, a base outer edge defining an outer-most boundary of the base and comprising a base edge groove, the base further comprises a base edge gasket at least partially extending into the base edge groove, the cover comprises a cover opening, and assembling the modular cartridge assembly comprises inserting the base into the cover opening such that the base edge gasket interfaces with and is sealed against the cover.

Clause 31. The method of clause 3, wherein: the base comprises a set of base attachment openings extending through the base and forming a base attachment opening sidewall, the cover comprises a set of cover attachment protrusions, each comprising a cover attachment protrusion groove and a cover attachment protrusion gasket at least partially extending into the cover attachment protrusion groove, and assembling the modular cartridge assembly comprises inserting the set of cover attachment protrusions into the set of base attachment openings such that the cover attachment protrusion gasket is sealed against the base attachment opening sidewall.

Clause 32. The method of clause 31, wherein assembling the modular cartridge assembly further comprises protruding a set of fasteners into the set of base attachment openings and screwing the set of fasteners into the set of cover attachment protrusions.

Clause 33. The method of clause 24, wherein the cover comprises a cover opening, a cover opening groove surrounding the cover opening, and a cover opening gasket at least partially extending into the cover opening groove, the ECAM printhead comprises an electrode array and an edge portion surrounding the electrode array, and assembling the modular cartridge assembly comprises compressing the cover opening gasket against the edge portion of the ECAM printhead.

Clause 34. The method of clause 24, further comprising, prior to positioning the modular cartridge assembly on the modular-cartridge-assembly support, aligning the modular-cartridge-assembly support relative to the cathode.

Clause 35. The method of clause 24, wherein: the support unit further comprises a support unit primary opening extending through the support unit and fluidically coupled to the sealed assembly cavity, the assembly support thermal plate comprises an assembly support primary opening extending through the assembly support thermal plate and fluidically coupled with the support unit primary opening as well as to a vacuum source, and reducing pressure within the sealed assembly cavity comprises flowing gas from the sealed assembly cavity to the vacuum source through the support unit primary opening and the assembly support primary opening.

Clause 36. The method of clause 35, wherein the assembly support thermal plate comprises a thermal plate primary gasket sealing the support unit relative to the assembly support thermal plate such that the support unit primary opening and the assembly support primary opening are positioned within a boundary of the thermal plate primary gasket.

Clause 37. The method of clause 36, wherein reducing pressure within the sealed assembly cavity also reduces pressure between the assembly support thermal plate and the support unit within the boundary of the thermal plate primary gasket.

Clause 38. The method of clause 36, wherein: the support unit further comprises a support unit leak detection opening extending through the support unit and fluidically coupled to the sealed assembly cavity; the assembly support thermal plate comprises an assembly support leak detection opening extending through the assembly support thermal plate and fluidically coupled with the support unit leak detection opening as well as to a pressure sensor, and each of reducing pressure within the sealed assembly cavity and performing the electrochemical additive manufacturing comprises monitoring the pressure in the sealed assembly cavity using the pressure sensor.

Clause 39. The method of clause 38, wherein the assembly support thermal plate comprises a leak detection port gasket sealing the support unit relative to the assembly support thermal plate such that the support unit leak detection opening and the assembly support leak detection opening are positioned within a boundary of the leak detection port gasket.

Clause 40. The method of clause 39, wherein the leak detection port gasket is positioned within the boundary of the thermal plate primary gasket.

Clause 41. The method of clause 24, further comprising, prior to assembling a modular cartridge assembly: connecting the support unit to the base, and connecting a busbar comprising the busbar external connector to the cover.

Clause 42. The method of clause 41, further comprising, after connecting the support unit to the base: connecting a control board comprising the control board external connector to the base, and connecting the control board to the ECAM printhead.

Clause 43. The method of clause 42, wherein: the ECAM printhead comprises electrode-array drivers and a set of flexible ribbon cables soldered to contacts of the ECAM printhead, the control board comprises a set of control board printhead connectors, and connecting the control board to the ECAM printhead comprises plugging the set of flexible ribbon cables to the set of control board printhead connectors.

Clause 44. The method of clause 24, wherein positioning the modular cartridge assembly on a modular-cartridge-assembly support comprises: plugging the control board external connector into the assembly support signal connector thereby forming a signal connection, plugging the busbar external connector into the assembly support power connector thereby forming an electrical connection, and forming an isolated fluidic connection between the sealed assembly cavity and a vacuum source connected to the modular-cartridge-assembly support.

Clause 45. The method of clause 24, wherein performing the electrochemical additive manufacturing further comprises circulating a liquid coolant through the modular-cartridge-assembly support.

Clause 46. The method of clause 24, wherein the current delivered to the subset of electrodes in the electrode array is at least 1 A/cm2.

Clause 47. The method of clause 24, wherein performing the electrochemical additive manufacturing further comprises monitoring one or more process parameters using the electrode array and determining when the ECAM printhead needs to be replaced.

Clause 48. The method of clause 24, further comprising: increasing the pressure within the sealed assembly cavity of the modular cartridge assembly; removing the modular cartridge assembly from the modular-cartridge-assembly support; disassembling the modular cartridge assembly; replacing the ECAM printhead in the modular cartridge assembly; and repeating assembling the modular cartridge assembly, positioning the modular cartridge assembly on a modular-cartridge-assembly support, reducing pressure within the sealed assembly cavity, and performing the electrochemical additive manufacturing.

BRIEF DESCRIPTION OF THE DRAWINGS

FIG. 2C is an exploded view of the modular cartridge assembly in FIGS. 2A and 2B illustrating various internal components of the assembly, in accordance with some examples.

DETAILED DESCRIPTION

Figure 1A:
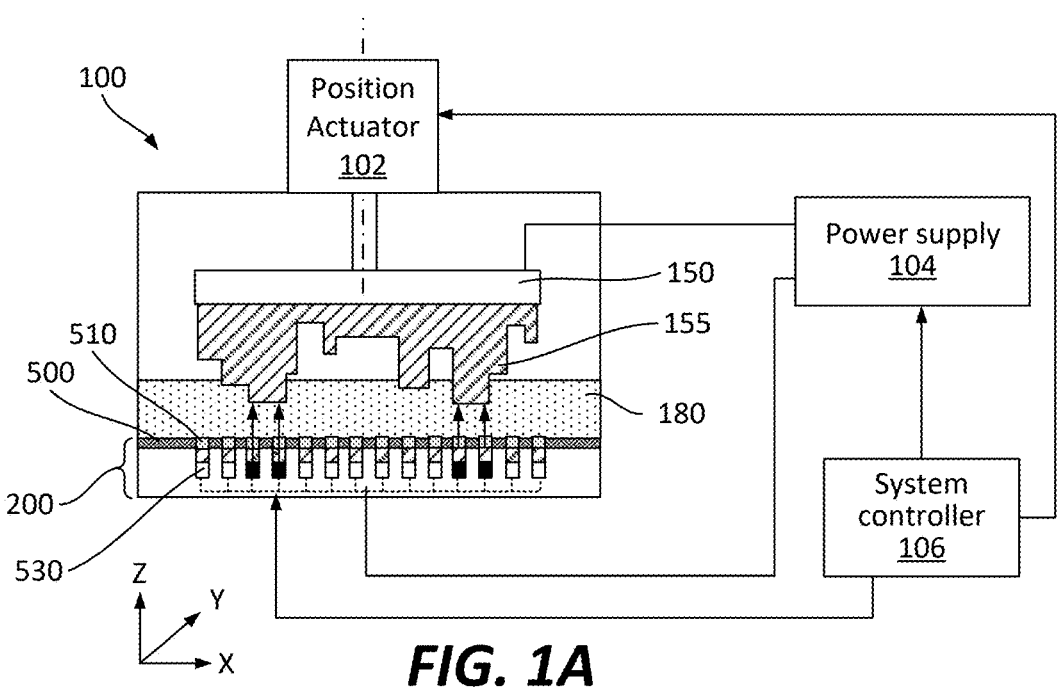
FIG. 1A is a schematic illustration of an ECAM system comprising a modular cartridge assembly, in accordance with some examples.

In the following description, numerous specific details are outlined to provide a thorough understanding of the presented concepts. The presented concepts may be practiced without some or all of these specific details. In other instances, well-known process operations have not been described in detail to not unnecessarily obscure the described concepts. While some concepts will be described in conjunction with the specific embodiments, it will be understood that these embodiments are not intended to be limiting.

Introduction

ECAM systems may utilize electrode arrays, which may be arranged into an ECAM printhead. Electrode arrays can be used for electrochemical material deposition (e.g., on a cathode opposite the electrode array) and/or measurements. In some examples, electrode arrays are used for other non-ECAM processing, e.g., medical research, medical implants, and semiconductor manufacturing. In some applications, electrode arrays are exposed to electrolyte solutions while being controlled by sensitive electronics (e.g., electrode-array drivers). These sensitive electronics may need to be positioned proximate to electrode arrays but (unlike the electrode arrays) need to be isolated and protected from electrolyte solutions. Furthermore, electrode arrays (and electronics) can be subjected to high current densities (e.g., at least 1 A/cm² to ensure adequate electroplating rates), which may cause resistive heating in various components of the electrode arrays and supporting components. Finally, electrochemical processing/electroplating can be damaging to electrode arrays, e.g., causing cracks in supporting insulators, electrode dissolution, and other problems.

Modular cartridge assemblies (MCAs), described herein, are specifically designed and configured to address various problems identified above. For example, an MCA may comprise a base, a cover, an ECAM printhead, and a support unit. These components may be assembled and sealed together to form an assembly cavity. Sensitive electronic components are positioned within this cavity and protected from the electrolyte while allowing the electrolyte to flow over the electrode array of the ECAM printhead. In some examples, a nozzle (or nozzles) may be used to spray a metal-containing electrolyte (e.g., an aqueous solution of a metal salt) across the electrode array. The electrolyte is flowed between the electrode array and a cathode, which may be referred to as a build plate and which contains a metal deposit. This metal deposit is electrochemically formed/electroplated by passing a current through the electrode array (e.g., a subset of electrodes in the array) and the corresponding portion of the cathode. The location of the metal deposit (being formed) depends on which electrodes in the electrode array are activated. In some examples, the MCA/ECAM printhead/electrode array and the build plate are moved (e.g., along a direction perpendicular to the electrode plate such as vertically, up, and down) to ensure the distribution of the fresh electrolyte and removal of the used electrolyte and bubbles.

Specifically, an MCA is used to house the ECAM printhead in the ECAM system, which may be referred to as an ECAM printer or simply a printer. The MCA may be equipped with a pair of handles for lowering the MCA onto an MCA support, which may also provide signal and electrical connections, mechanical alignment, and cooling. The MCA has one or more of the following features for (a) protection of the ECAM printhead mechanically and chemically, (b) ability to remove and replace MCAs throughout the process (e.g., when the ECAM printhead malfunctions or to replace with a different type ECAM printhead) as well as the ability to replace the ECAM printhead within the MCA, (c) exposure of the entire active area of the ECAM printhead, (d) provision for multiple power supply pads on the periphery of the ECAM printhead, and (e) leak detection through pressure monitoring.

ECAM System Examples

Modular cartridge assemblies may be used for various applications and systems, e.g., ECAM system 100. FIG. 1A is a schematic illustration of ECAM system 100 used for depositing or, more specifically, electroplating material 155, in accordance with some examples. ECAM system 100 may comprise a position actuator 102, a system controller 106, a deposition power supply 104, a modular cartridge assembly 200, and a deposition electrode 150. In some examples, deposition electrode 150 is connected to deposition power supply 104 and controllably supported relative to the modular cartridge assembly 200 (e.g., by position actuator 102).

A modular cartridge assembly 200 comprises an ECAM printhead 500, which in turn comprises an electrode array 510 and electrode-array drivers 530. Each of the electrode-array drivers 530 controls the current flow through a corresponding electrode in the electrode array 510 as well as the corresponding portion of the electrolyte solution 180 thereby causing the deposition on the corresponding surface of material 155 on deposition electrode 150.

Position actuator 102 can be mechanically coupled to deposition electrode 150 and used to change the relative position of the modular cartridge assembly 200 and deposition electrode 150 (e.g., changing the gap between the ECAM printhead 500 and deposition electrode 150 or, more specifically, the gap between the electrode array 510 and deposition electrode 150, linearly moving and/or rotating one or both modular cartridge assembly 200 and deposition electrode 150 within a plane parallel to the electrode array 510). While FIG. 1A illustrates position actuator 102 being coupled to deposition electrode 150, other examples are also within the scope.

System controller 106 is used for controlling the operations of various components. For example, FIG. 1A illustrates system controller 106 being communicatively coupled with position actuator 102, deposition power supply 104, and electrode-array drivers 530. The system controller 106 can instruct position actuator 102 to change the relative position of the modular cartridge assembly 200 and deposition electrode 150. In the same or other examples, the system controller 106 can selectively instruct some electrode-array drivers 530 to provide current through corresponding electrodes of the electrode array 510.

During the operation of ECAM system 100, system 100 also comprises electrolyte solution 180 comprising a source of cations (e.g., metal cations) that are reduced on deposition electrode 150 (operable as a cathode during this operation) and form material 155. More specifically, material 155 is deposited onto deposition electrode 150 from electrolyte solution 180 by flowing the electrical current between selected electrodes in the electrode array 510 and the deposition electrode 150 as noted above. In some examples, further granularity is provided by controlling the current levels through each one of the electrode-array drivers 530. In other words, not only the current can be shut off through one or more electrode-array drivers 530 but different levels of current can flow through different electrode-array drivers 530 (and as a result through the corresponding electrodes in the electrode array 510).

Figure 1B:
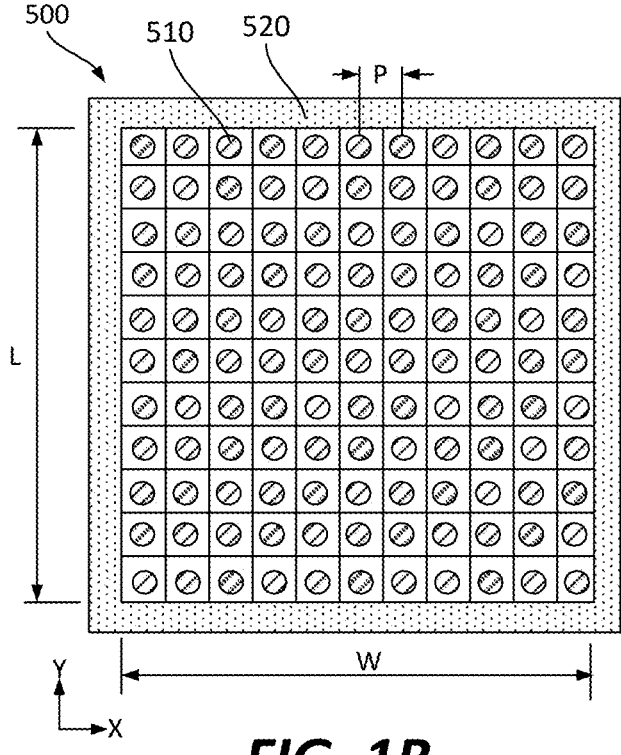
FIG. 1B is a schematic planar view of an ECAM printhead comprising an array of electrodes, in accordance with some examples.

Referring to FIG. 1B, an ECAM printhead 500 comprises an electrode array 510. These electrodes may be also referred to as microelectrodes (or micro-anodes), and/or pixels. This individually-addressable feature of the electrode array 510 allows the achievement of different deposition rates at different locations on deposition electrode 150. The electrodes form a deposition grid, in which these electrodes may be offset relative to each other along the X-axis and Y-axis, each within a grid footprint. Rectangular grids may be characterized by a grid X-axis pitch (corresponding to the length of each grid region along the X-axis), grid Y-axis pitch (corresponding to the length of a grid region along the Y-axis), overall grid pitch (corresponding to the minimum of the grid X-axis pitch and the grid Y-axis pitch), and grid region area. In the same or other examples, one or both of the grid's X-axis pitch and the Y-axis pitch are 100 micrometers or less, 50 micrometers or less, or even 35 micrometers or less. Other example grids include triangular, hexagonal, or other patterns that partially or completely tessellate a surface. In some examples, the electrodes are formed/deposited from an insoluble conductive material, such as platinum group metals and their associated oxides, doped semiconducting materials, and carbon nanotubes. The shape of the electrodes can be round, rectangular, or other shapes. The area of the electrodes (the pixel size) is smaller (e.g., at least 1% smaller, at least 10% smaller, at least 20% smaller) than the grid footprint, thereby providing space between the electrodes. In some examples, the pitch is between 25 micrometers and 35 micrometers, while the pixel size is between 15 micrometers and 20 micrometers.

Figures 1C, 1D:
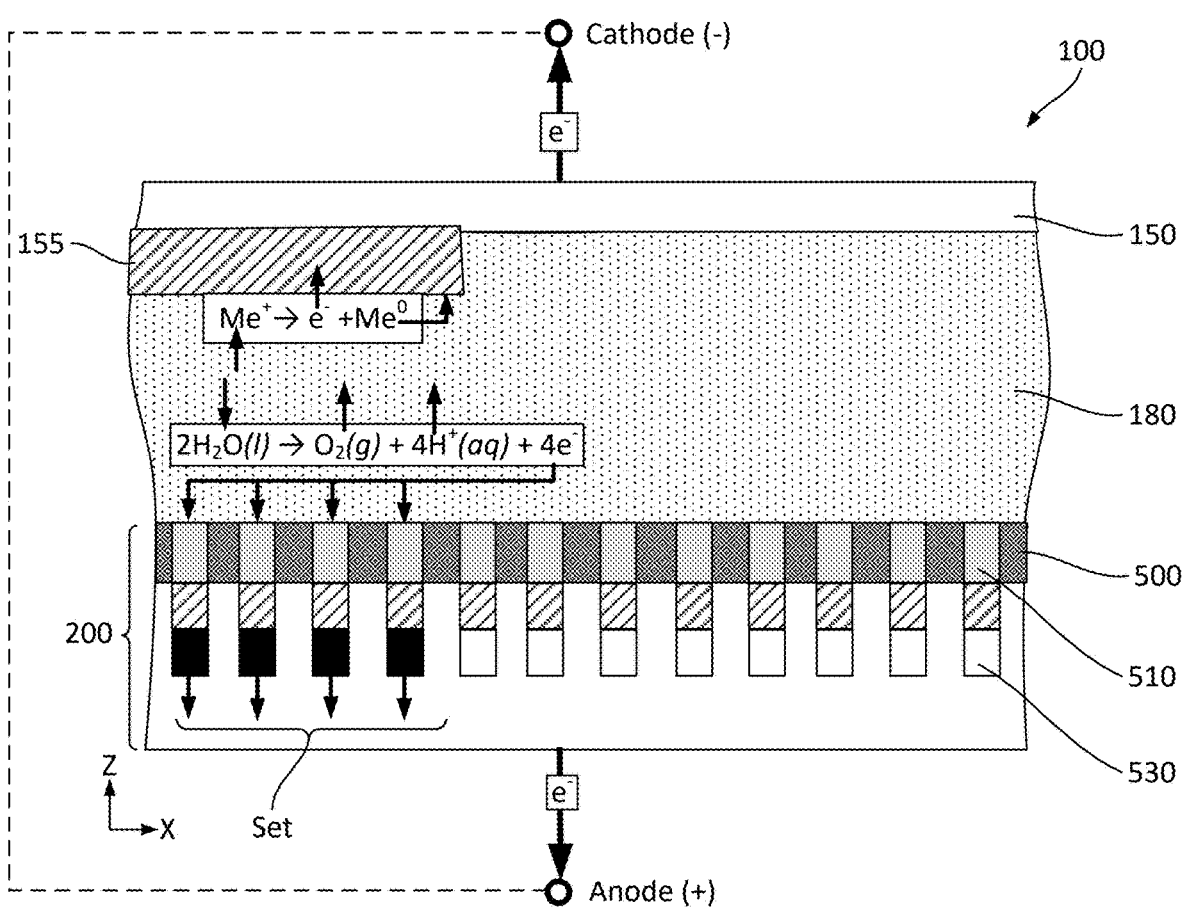
FIG. 1C is a schematic cross-sectional view of an ECAM system illustrating the electrolytic deposition of material from the electrolyte solution onto a deposition electrode, in accordance with some examples.
FIG. 1D is a block diagram illustrating various components of an electrolytic solution used for electrolytic deposition, in accordance with some examples.

FIG. 1C is a schematic expanded view of a portion of ECAM system 100 illustrating electrolyte solution 180 between the modular cartridge assembly 200 and deposition electrode 150, in accordance with some examples. FIG. 1D is a schematic block diagram illustrating different components of electrolyte solution 180. For example, electrolyte solution 180 may comprise salt 182, electrolyte solution solvent 186, and conductive agent 188. Salt comprises cations 183 and anions 184. Cations 183 can be in the form of metal ions, metal complexes, and the like. Some examples of cations 183 include metal cations (e.g., copper ions, nickel ions, tungsten ions, gold ions, silver ions, cobalt ions, chrome ions, iron ions, or tin ions), and other types of cations are within the scope. Some specific examples of salt 182 (feedstock ion sources) include but are not limited to copper sulfate, copper chloride, copper fluoroborate, copper pyrophosphate, nickel sulfate, nickel ammonium sulfate, nickel chloride, nickel fluoroborate, zinc sulfate, sodium thiocyanate, zinc chloride, ammonium chloride, sodium tungstate, cobalt chloride, cobalt sulfate, hydroxy acids, and aqua ammonia. In some examples, feedstock ion sources, or other sources of cations (e.g., salts) are referred to as material concentrates. Electrolyte solution solvent 186 can be water, which dissociates $(2H_2O(l) \Rightarrow O_2 (g) + 4H^+(aq.) + 4e^-)$ on the electrodes that are activated during this operation. Specifically, the activated electrodes are connected to the deposition power supply. In some examples, electrolyte solution 180 comprises catholyte conductive agent 188, such as an acid (e.g., sulfuric acid, acetic acid, hydrochloric acid, nitric acid, hydrofluoric acid, boric acid, citric acid, and phosphoric acid). In some examples, electrolyte solution 180 comprises one or more additives, such as a leveler, a suppressor, and an accelerator, particulates for co-deposition (e.g., nanoparticles and microparticles such that diamond particles, tungsten-carbide particles, chromium-carbide particles, and silicon-carbide particles).

Returning to the example shown in FIG. 1D, cations (e.g., metal cations are combined with electrons, which are supplied to deposition electrode 150 thereby forming material 155 (e.g., metal deposit—Me⁰). As noted above, the charge balance within electrolyte solution 180 is maintained by protons generated at the modular cartridge assembly 200. It should be noted that only a set of activated electrodes (illustrated in black color) can be activated during this ECAM process resulting in electrolytic deposit/material 155 formed on a corresponding portion of deposition electrode 150. This corresponding portion is aligned with the activated electrode while the remaining portion of electrodes (inactive electrodes) remains free of electrolytic deposit. This selective deposition is a core ECAM feature provided by selective control of the current passing through the activated electrodes.

Examples of Modular Cartridge Assemblies

Figure 2A:
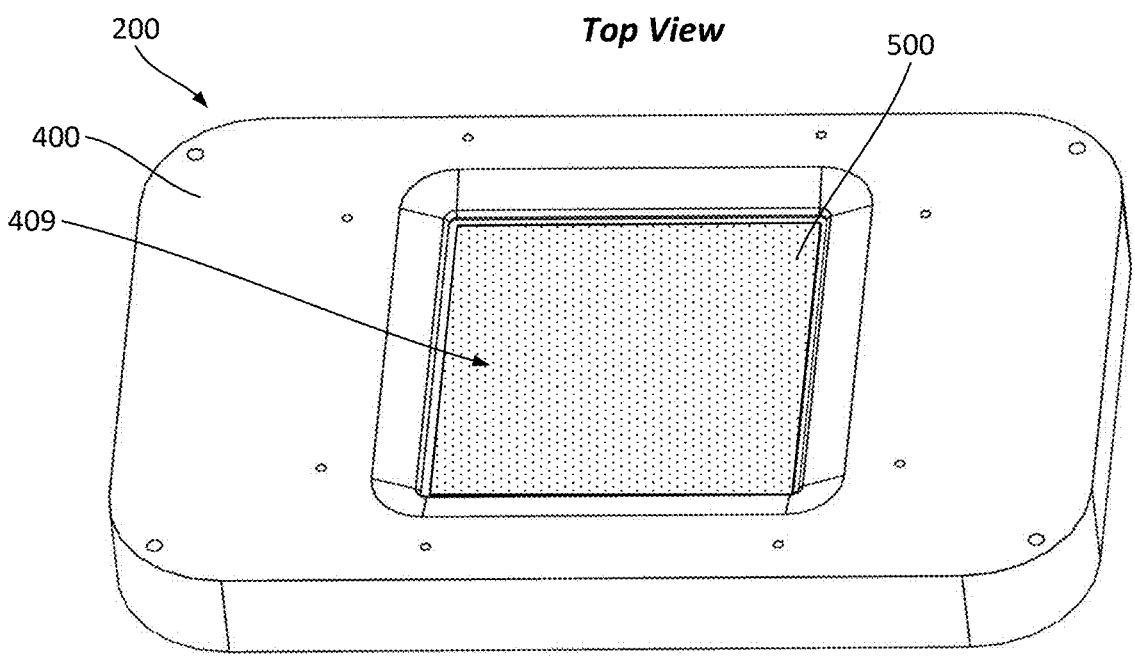
FIGS. 2A and 2B are schematic top and bottom perspective views of a modular cartridge assembly in the assembled form, in accordance with some examples.
Figure 2B:
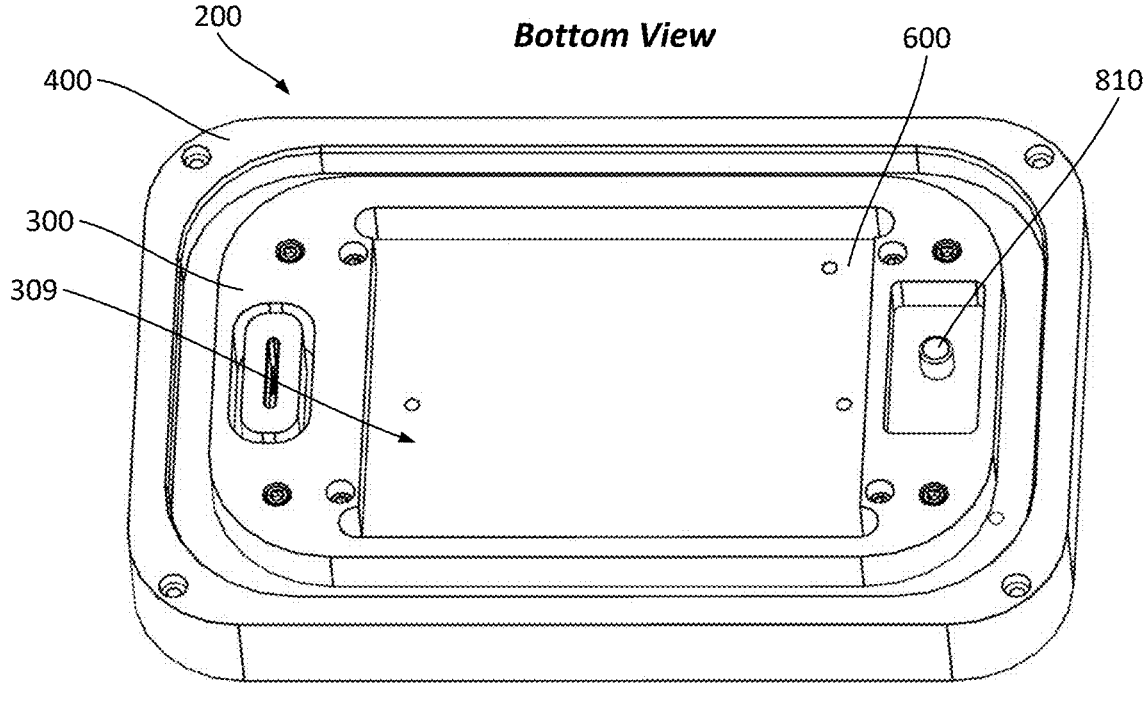
Figure 2C:
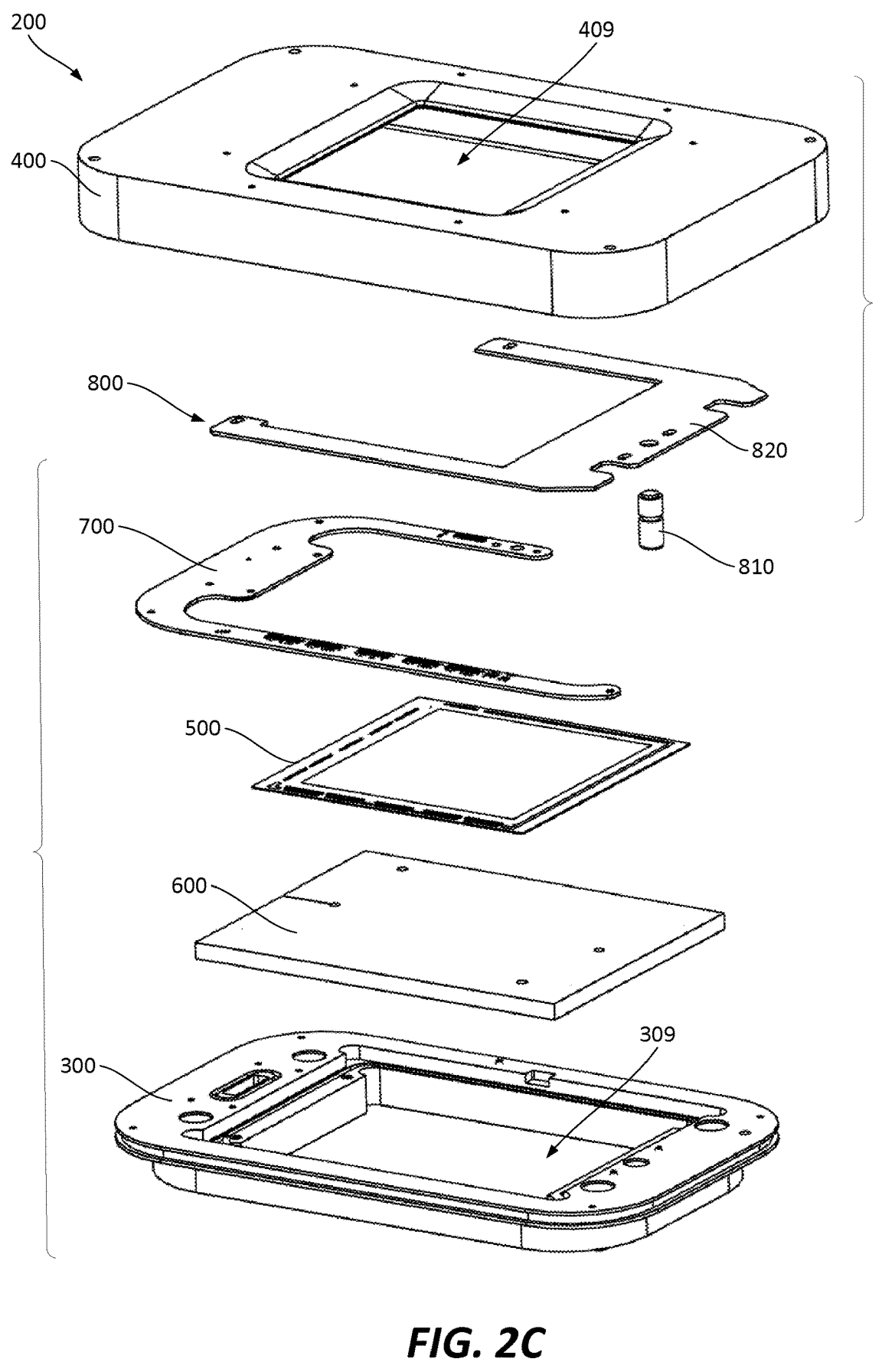

FIGS. 2A and 2B are perspective top and bottom views of a modular cartridge assembly 200 for electrochemical additive manufacturing (ECAM), in accordance with some examples. FIG. 2C is an exploded view of the modular cartridge assembly 200 in FIGS. 2A and 2B. Various aspects of ECAM processes and ECAM systems that utilize such modular cartridge assemblies 200 are described above.

The modular cartridge assembly 200 comprises a base 300, a cover 400, an ECAM printhead 500, a support unit 600, and a control board 700. In some examples, the modular cartridge assembly 200 also comprises a busbar 800. Alternatively, the busbar functions are performed by the control board 700. The cover 400 is attached to and sealed against the base 300 forming a sealed enclosure, in which various components are positioned and supported, e.g., by the base 300 and/or the cover 400. The base 300 comprises a base opening 309, which exposes a portion of the support unit 600, e.g., for aligning on a modular cartridge assembly support and forming various fluidic connections with the sealed enclosure (as further described below with reference to FIGS. 9, 10A-10C). The cover 400 comprises a cover opening 409, which exposes a portion (e.g., the electrode array 510) of the ECAM printhead 500 and allows this portion of the ECAM printhead 500 to come in contact with electrolyte during operation.

In some examples, a base 300 is made of a material that is impervious to the operating environment of the modular cartridge assembly 200 (e.g., electrolyte presence, temperatures). Some of the suitable materials include, but are not limited to, polycarbonate, polyether ether ketone (PEEK), polyetherimide (ULTEM®), and the like. A base 300 may be manufactured using computer numerical control (CNC) machining, injection molding, diffusion bonding, or the like.

Figure 3A:
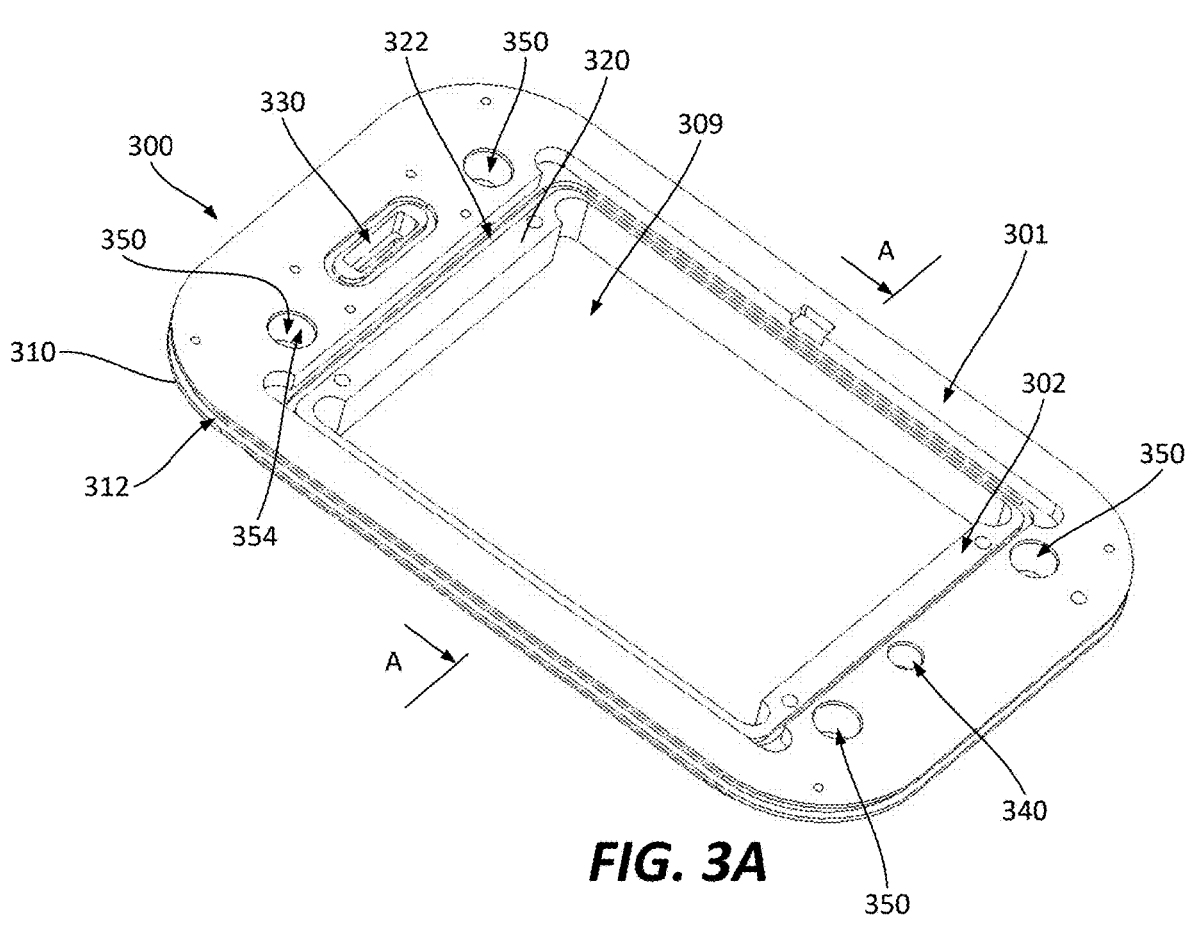
FIGS. 3A and 3B are schematic top and bottom perspective views of the base of the modular cartridge assembly in FIGS. 2A and 2B, in accordance with some examples.
Figure 3B:
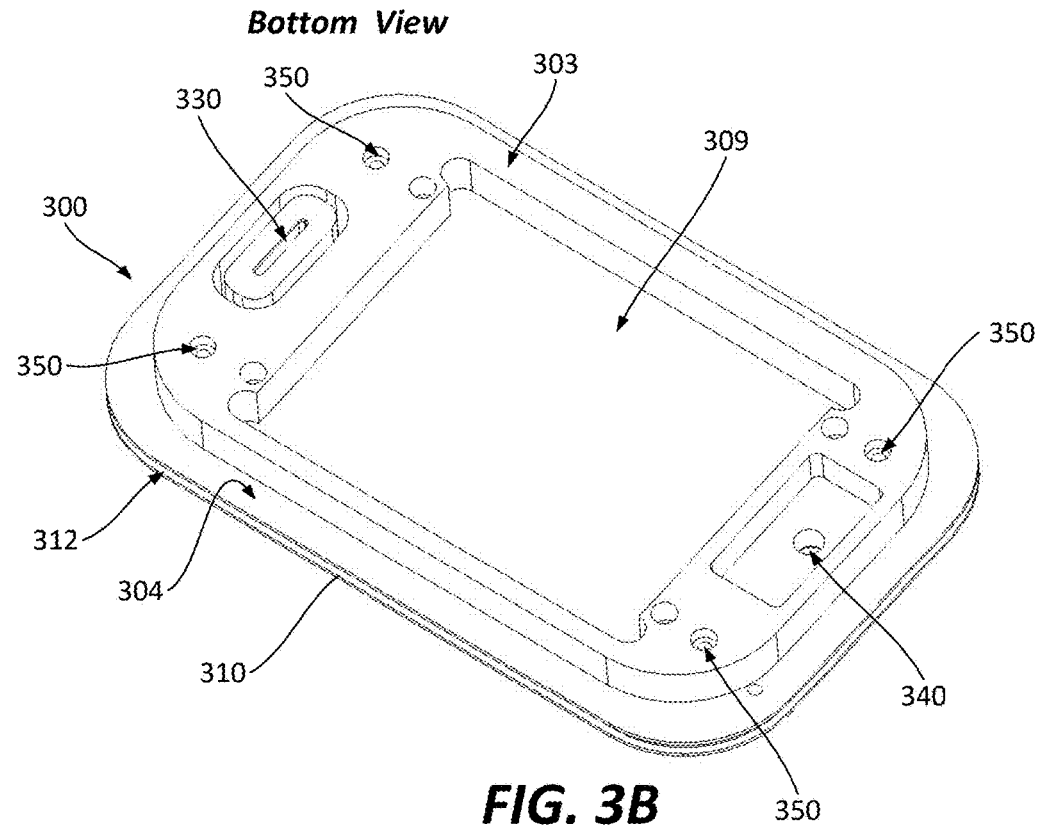
Figure 3C:
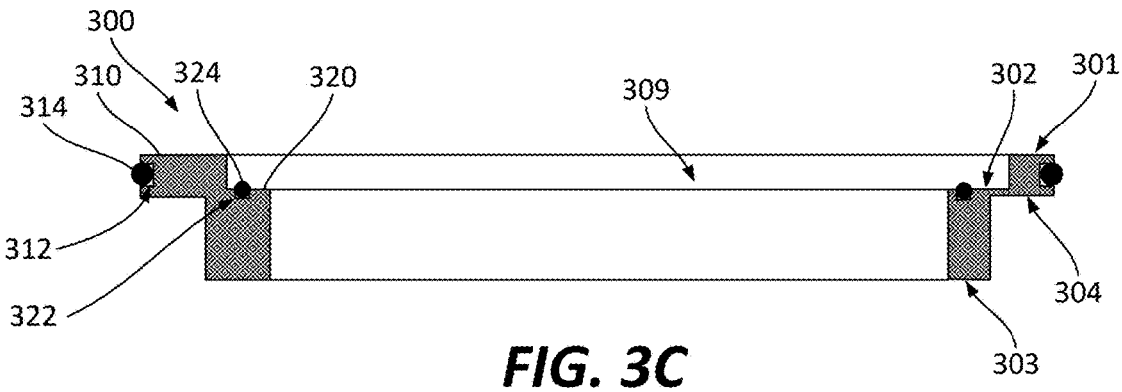
FIG. 3C is a schematic cross-sectional view of the base in FIGS. 3A and 3B illustrating a base edge groove and a base recessed support groove as well as gaskets positioned within these grooves, in accordance with some examples.

Referring to FIGS. 3A-3C, in some examples, a base 300 comprises a base first surface 301, a base second surface 302, a base third surface 303, and a base fourth surface 304 such that all these surfaces are parallel to each other. The base second surface 302 is offset relative to the base first surface 301 and comprises a base recess support 320 positioned within the base opening 309. A base recessed support groove 322 is provided within the base recess support 320. The 300 may also comprise a base recessed support gasket 324 at least partially extending into the base recessed support groove 322, e.g., as shown in FIG. 3C.

Figure 3D:
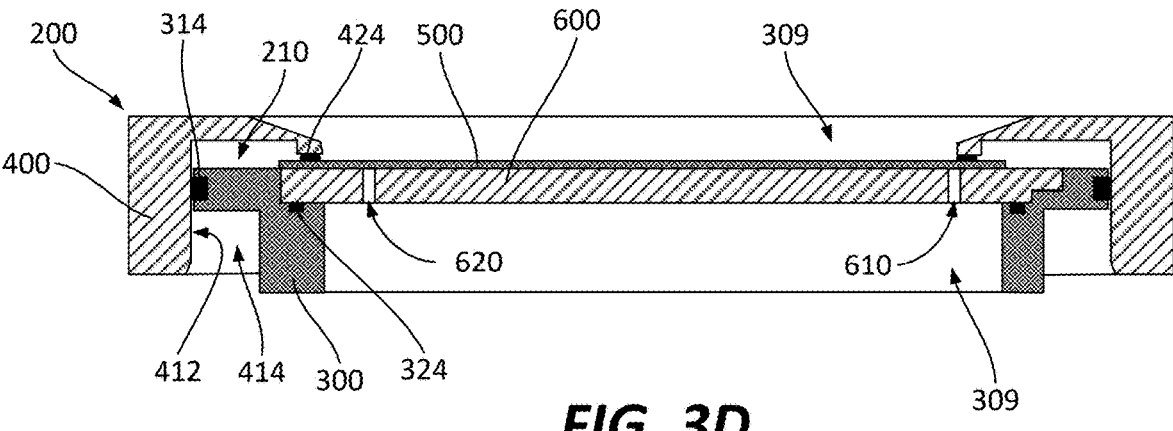
FIG. 3D is a schematic cross-sectional view of the modular cartridge assembly in FIGS. 2A and 2B illustrating various seals formed by the base and the cover in this assembly, in accordance with some examples.

Referring to FIG. 3D, during the fabrication or refurbishment of the modular cartridge assembly 200, the support unit 600 protrudes into a portion of the base opening 309 and is supported by the base recess support 320. The 600 is also sealed against the base recessed support gasket 324. In some examples, an additional portion of the base opening 309 (e.g., extending from the base second surface 302 and in the direction away from the base first surface 301) is available for protruding an MCA support when the modular cartridge assembly 200 is installed on the MCA support or, more generally, on the ECAM system. These two portions of the base opening 309 are separated by a plane (e.g., coplanar with the base recess support 320/the base second surface 302). Overall, the base opening 309 provides access to the support unit 600 and allows for direct contact/interface between the support unit 600 and the MCA support (as further described below with reference to FIGS. 9, 10A-10C).

Referring to FIGS. 3C and 3D, in some examples, the base 300 comprises a base outer edge 310 defining an outer-most boundary of the base 300 and comprising a base edge groove 312. Specifically, the base outer edge 310 extends between the base first surface 301 and the base fourth surface 304. The base 300 further comprises a base edge gasket 314 at least partially extending into the base edge groove 312.

Figure 4A:
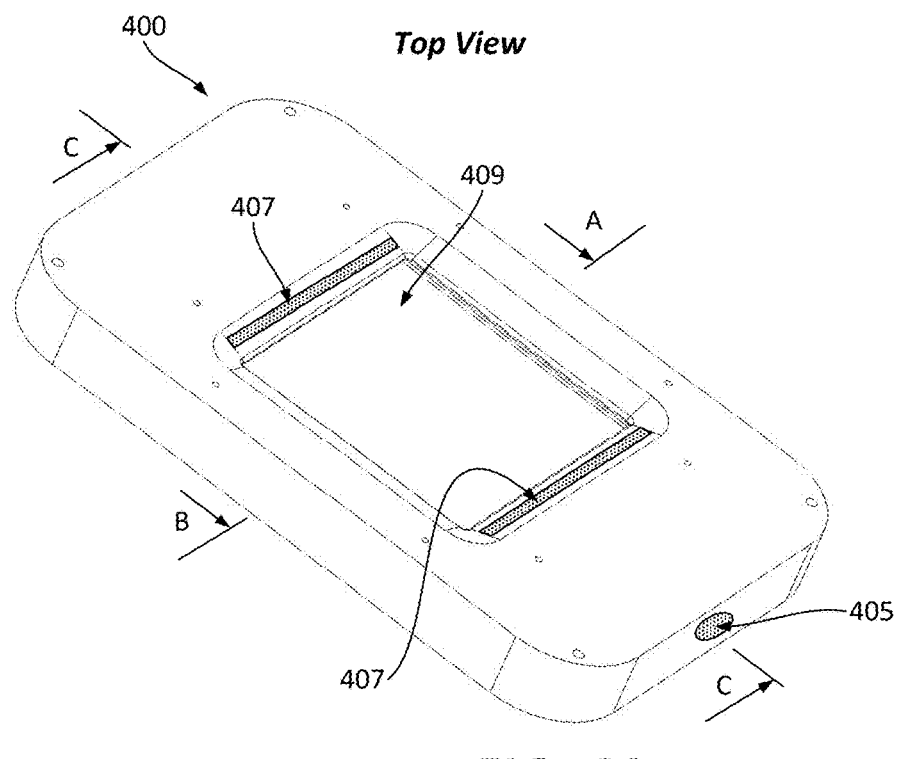
FIGS. 4A and 4B are schematic top and bottom perspective views of the cover of the modular cartridge assembly in FIGS. 2A and 2B, in accordance with some examples.
Figure 4B:
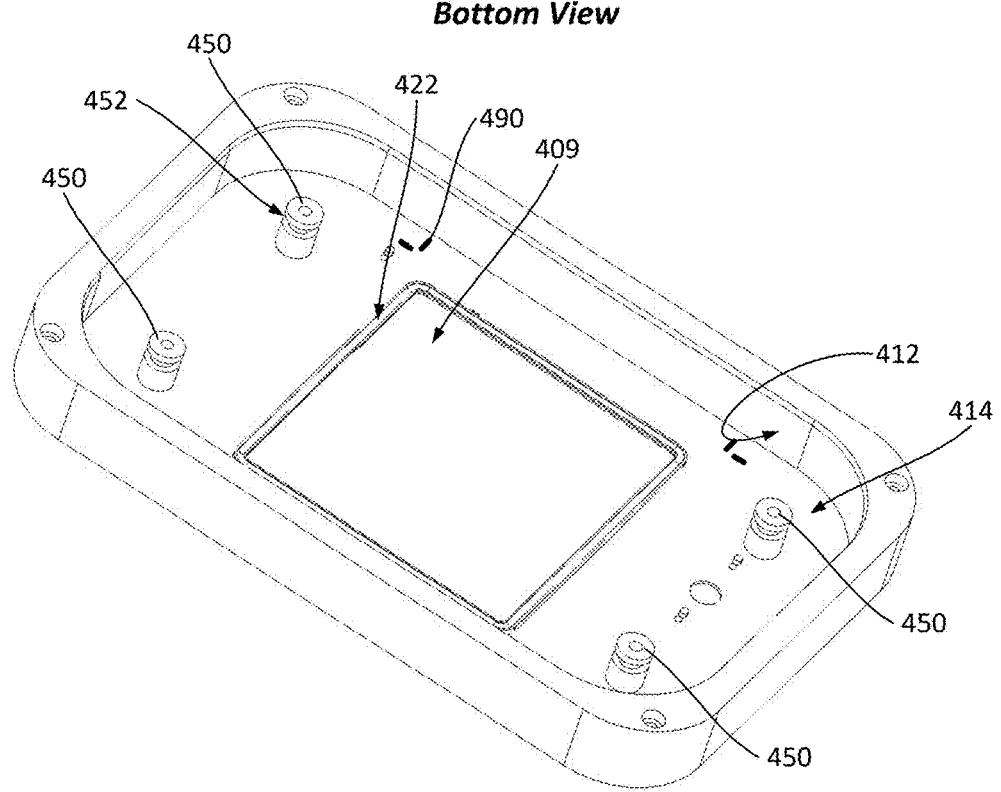

Referring to FIG. 4B, the cover 400 comprises an interior side wall 412 defining a cover open cavity 414 that extends to the cover opening 409. During the fabrication or refurbishment of the modular cartridge assembly 200, the base 300 at least partially extends into the cover open cavity 414 such that the base edge gasket 314 forms a seal with the interior side wall 412, e.g., as shown in FIG. 3D.

Figure 3E:
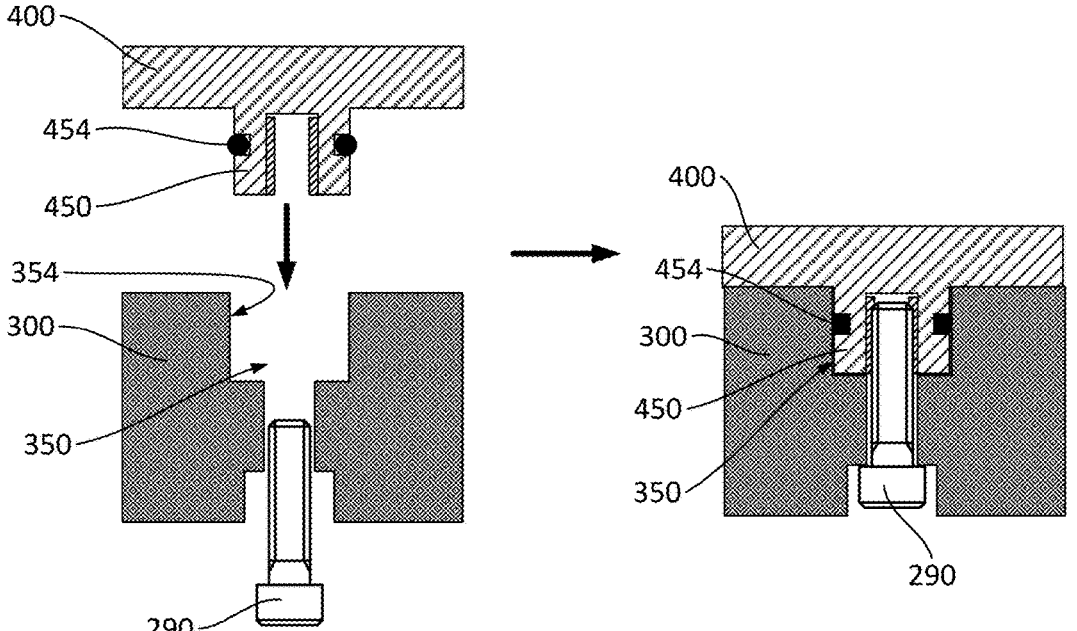
FIG. 3E is a schematic cross-sectional view of a cover attachment protrusion and a base attachment opening before and after engaging these components during the fabrication or refurbishing of the modular cartridge assembly, in accordance with some examples.

The base 300 and the cover 400 may be also mechanically attached relative to each other using fasteners, e.g., as schematically shown in FIG. 3E. Referring to FIGS. 3A, 3B, and 3E, the base 300 comprises a set of base attachment openings 350 extending through the base 300 and forming a base attachment opening sidewall 354. Referring to FIG. 4B and FIG. 3E, the cover 400 comprises a set of cover attachment protrusions 450, each comprising a cover attachment protrusion groove 452. Furthermore, referring to FIG. 3E, each of the set of cover attachment protrusions 450 comprises a cover attachment protrusion gasket 454 at least partially extending into the cover attachment protrusion groove 452. The set of cover attachment protrusions 450 extends into the set of base attachment openings 350 such that the cover attachment protrusion gasket 454 is sealed against the base attachment opening sidewall 354. The cover attachment protrusion gasket 454, base recessed support gasket 324, and base edge gasket 314 at least in part define the boundary of the sealed assembly cavity 210 (while other gaskets and seals may also be within the scope and may further define this boundary).

Referring to FIG. 3E, in some examples, a modular cartridge assembly 200 further comprises a set of fasteners 290, one for each opening in the set of base attachment openings 350. The fastener 290 protrudes through a corresponding opening and engages the corresponding cover attachment protrusion 450 or, more specifically, a nut insert positioned in the cover attachment protrusion 450. The set of fasteners 290 force the base 300 against the cover 400 thereby compressing the base recessed support gasket 324 and other gaskets while forming the sealed assembly cavity 210.

In some examples, cover 400 is made of a material that is impervious to the operating environment of the modular cartridge assembly 200 (e.g., electrolyte presence, temperatures). Some suitable materials include, but are not limited to, polycarbonate, polyether ether ketone (PEEK), polyetherimide (ULTEM®), and the like. Cover 400 may be manufactured using computer numerical control (CNC) machining, injection molding, and/or diffusion bonding. In some examples, various accessories (e.g., flow nozzles, sensors, feedback indicators, ergonomic grips, etc.) may be attached to the cover 400 for further customization and additional functionality of the modular cartridge assembly 200.

Figures 4C, 4D, 4E, 4F, 4G:
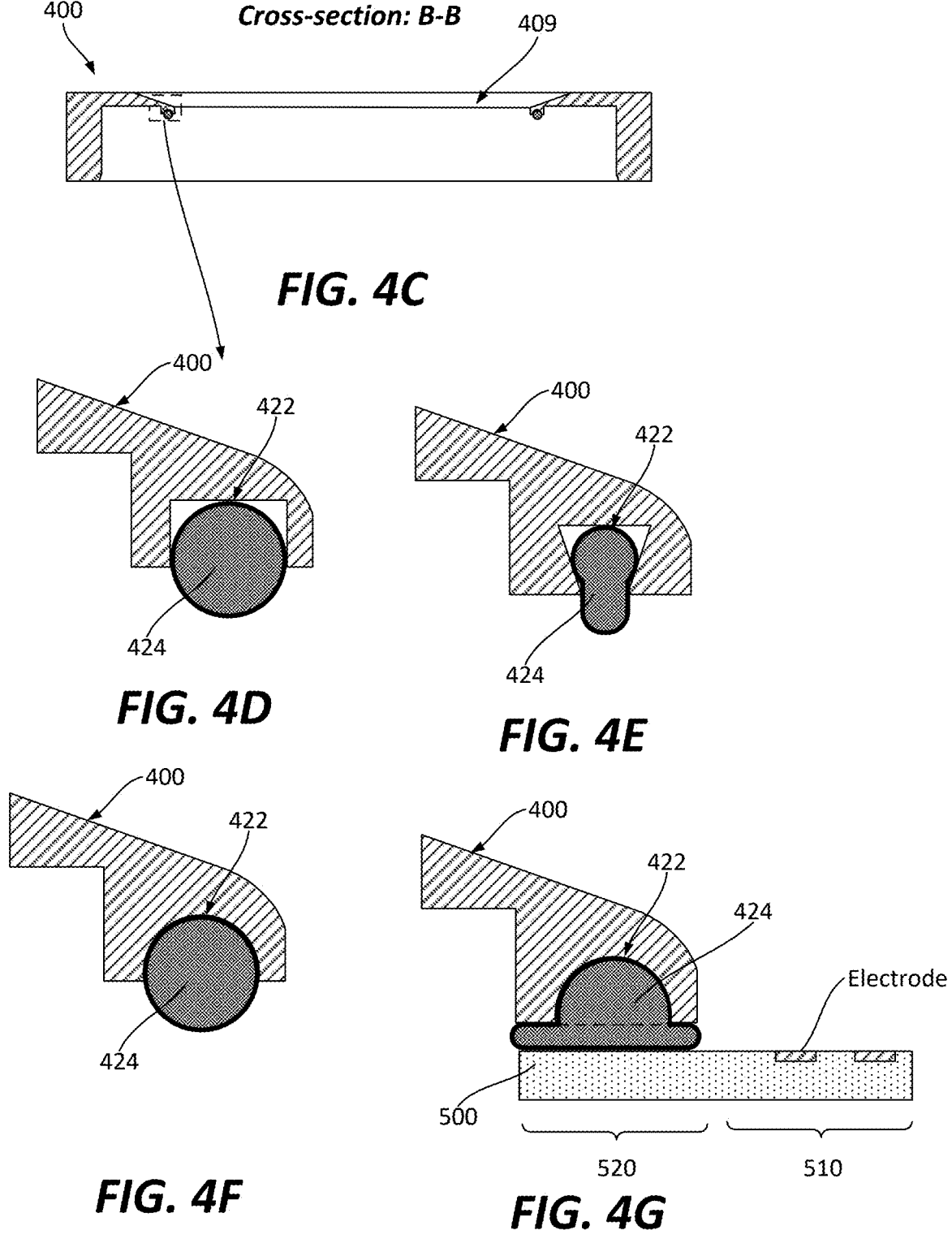
FIG. 4C is a schematic cross-sectional view of the cover in FIGS. 4A and 4B, in accordance with some examples.
FIGS. 4D-4F are schematic cross-sectional views of different examples of the cover opening groove and the cover opening gasket positioned in the groove.
FIG. 4G is a schematic cross-sectional view of the cover opening gasket sealed against the ECAM printhead, in accordance with some examples.

Referring to FIGS. 4A and 4B, as noted above, cover 400 comprises a cover opening 409 that is used to expose a portion of the ECAM printhead 500. Referring to FIGS. 4B-4G, in some examples, the cover 400 also comprises a cover opening groove 422 surrounding the cover opening 409 and a cover opening gasket 424 at least partially extending into the cover opening groove 422. The cover opening gasket 424 is used to seal against the ECAM printhead 500 or, more specifically, against the edge portion 520 of the ECAM printhead 500, surrounding the electrode array 510, e.g., as schematically shown in FIG. 4G. The cover opening gasket 424 may be an O-ring or other type of gasket. The term "gasket" is defined as any piece of material used to make a seal between two surfaces, e.g., the cover opening groove 422 and the edge portion 520.

Various examples of cover opening grooves 422 and cover opening gaskets 424 are shown in FIGS. 4D-4F. Specifically, FIG. 4D illustrates a cover opening groove 422 having a rectangular cross-section, which can be easily machined. However, this type of groove may allow the cover opening gasket 424 (e.g., an O-ring) to fall out when the cover 400 is removed. FIG. 4E illustrates a cover opening groove 422 having a tapered cross-section (e.g., beveled/dovetailed groove), which can be used to retain the cover opening gasket 424 within the cover opening groove 422, e.g., while handling the cover 400 and before assembling the modular cartridge assembly 200. However, the combinations of the cover opening grooves 422 and cover opening gaskets 424 are shown in FIGS. 4D and 4E may retain fluid in the spaces around the cover opening gaskets 424 shown, which may not be desirable. For example, retained fluid (e.g., residual electrolyte) may be released during disassembly of the modular cartridge assembly 200.

FIG. 4F illustrates a cover opening gasket 424 that conforms to a corresponding cover opening groove 422 in an uncompressed state. In this example, the cover opening gasket 424 substantially fills the cover opening groove 422. In other words, the cover opening groove 422 is a conformal groove. Such a groove may be sized and shaped such that a matching gasket can be inserted such that no fluid gap results. While FIG. 4F illustrates an example of an O-ring fitted into an appropriate conformal groove, other types of conformal grooves and gaskets are also within the scope. Since the shape of the groove conforms to the gasket, there is no room for any fluid (e.g., residual electrolyte) to become trapped in the groove around the gasket.

This feature ideally ensures that no gaps are present in the cover opening groove 422 when the cover opening gasket 424 is compressed and sealed against the ECAM printhead 500, e.g., as schematically shown in FIG. 4G. Without gaps, the electrolyte can not slip in and be retained in the cover opening groove 422 when the modular cartridge assembly 200 or, more specifically, the ECAM printhead 500 is exposed to the electrolyte, which simplifies cleaning the modular cartridge assembly 200 and/or using different electrolyte formulations for the same modular cartridge assembly 200.

Figures 4H, 4I:
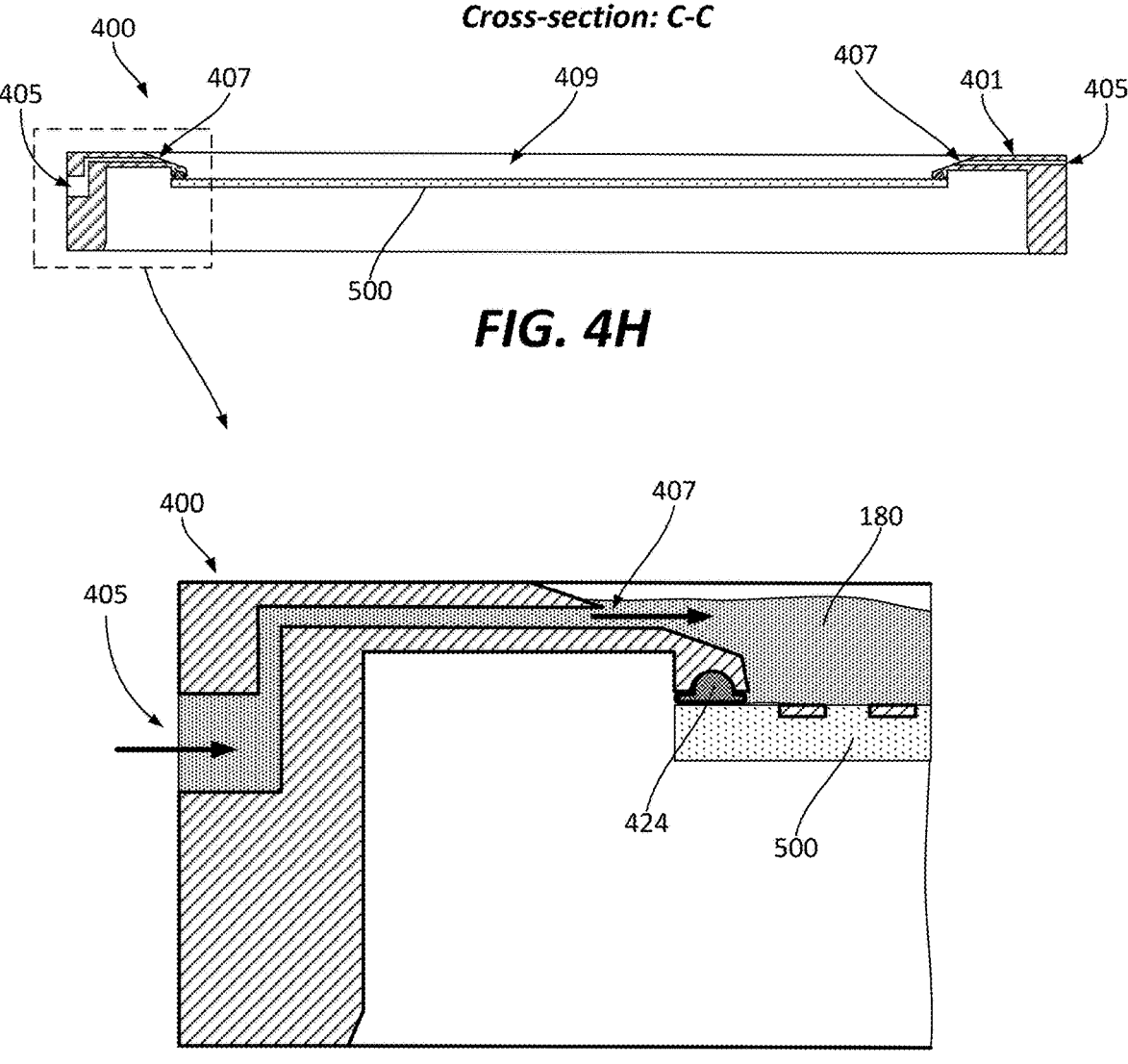
FIGS. 4H and 4I are schematic cross-sectional views of the cover illustrating electrolyte delivery connectors and slots, in accordance with some examples.

Referring to FIGS. 4H and 4I, in some examples, the cover 400 comprises a set of electrolyte delivery slots 407 and a set of electrolyte delivery connectors 405, positioned away from the cover opening 409 and fluidically coupled to the set of electrolyte delivery slots 407. The set of electrolyte delivery slots 407 is positioned proximate to the cover opening 409 and configured to uniformly distribute electrolyte to the first printhead side 501, exposed through the cover opening 409, and to collect the electrolyte from the first printhead side 501. This type of electrolyte delivery and collection allows to minimize the exposure of various components of the modular cartridge assembly 200 to the electrolyte thereby potentially eliminating the need for some seals. Furthermore, reducing the exposed area of electrolytes helps to protect electrolytes from evaporation and/or oxidation and also protects the environment from the potentially harmful effects of the electrolyte.

Figure 5A:
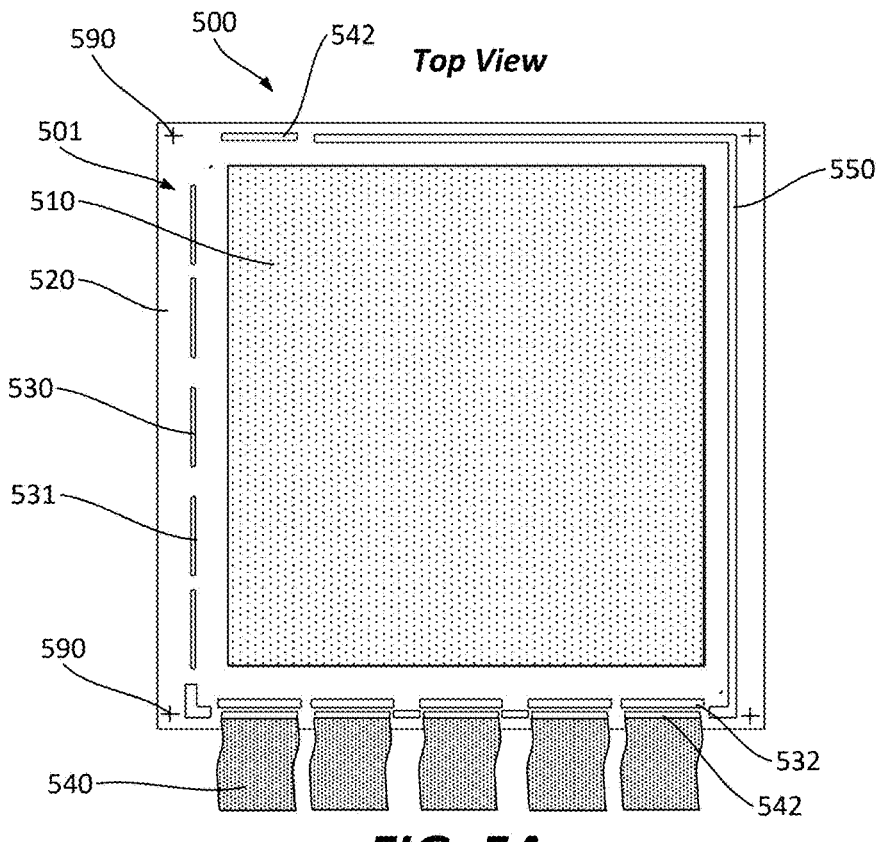
FIGS. 5A and 5B are schematic top and bottom views of the ECAM printhead of the modular cartridge assembly in FIGS. 2A and 2B illustrating various features on different sides of the ECAM printhead, in accordance with some examples.
Figure 5B:
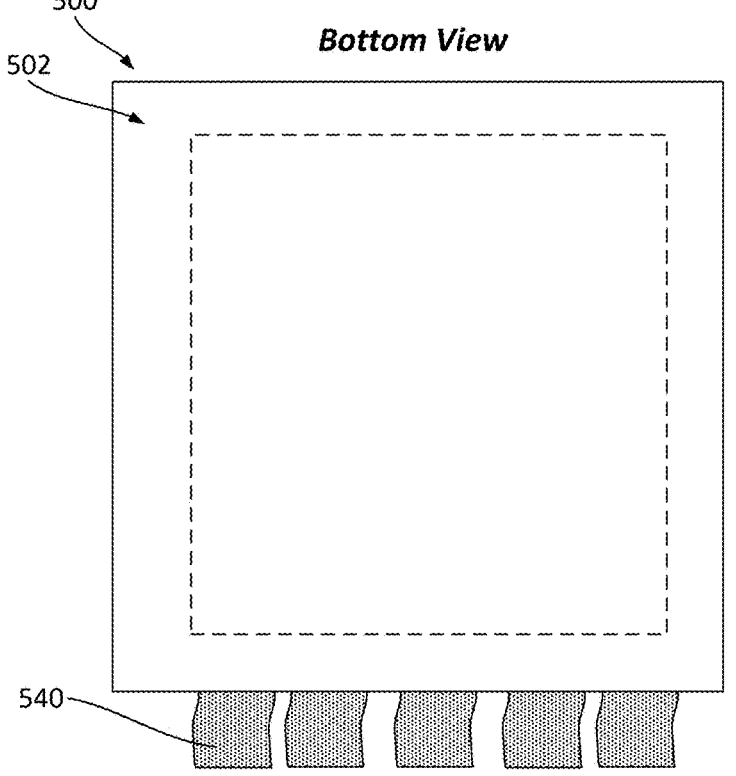

Referring to FIGS. 5A and 5B, in some examples, the ECAM printhead 500 is defined by a first printhead side 501 and a second printhead side 502 opposite to the first printhead side 501. The second printhead side 502 may be a flat rigid substrate (e.g., formed by glass, silicon, or the like). Circuitry to enable both the application of deposition current and/or to measure various parameters of the deposition such as current flow, voltage, etc. may be fabricated on the first printhead side, for example using thin film transistors on glass techniques. The circuitry may also be fabricated on the second printhead side, embedded between the first printhead side 501 and the second printhead side 502. The first printhead side 501 has an active area, which is exposed through the cover opening 409. In some examples, row, and column I/O chips (which are collectively referred to as electrode-array drivers 530) are bonded directly to the ECAM printhead 500, on either side of the printhead.

The ECAM printhead 500 comprises an electrode array 510 and an edge portion 520 surrounding the electrode array 510 on the first printhead side 501, e.g., as shown in the example printhead of FIG. 5A. As described above, the edge portion 520 is sealed against the cover opening gasket 424. Specifically, the electrode array 510 is aligned with and exposed through the cover opening 409 (e.g., to electrolyte during the operation of the modular cartridge assembly 200).

Referring to FIGS. 5A and 5B, in some examples, the ECAM printhead 500 comprises, on the first printhead side 501, electrode-array drivers 530 positioned on the edge portion 520 and electrically connected to each electrode in the electrode array 510, to the control board 700 and, in some examples, to the busbar 800. The electrode-array drivers 530 are configured to select the subset of electrodes in the electrode array 510 for receiving the current from the busbar 800 based on the signal received from the control board 700. Specifically, the electrode-array drivers 530 may compromise row drivers 531 and column drivers 532. Each row driver 531 controls all electrodes (in the electrode array 510) in the corresponding row. Similarly, each column driver 532 controls all electrodes (in the electrode array 510) in the corresponding column, extending perpendicular to all rows in the electrode array 510. As such, each electrode in the electrode array 510 is individually addressable using a combination of one row driver 531 and one column driver 532. In some examples, rows are enabled serially, while columns are enabled in parallel. In some examples, a plating current is supplied through the printhead side. For example, a thin busbar or an additional conductive layer is positioned between the second printhead side 502 and the support base 600. This feature reduces bussing complexity, lowers resistance, and provides a low heat-resistant path for active cooling of both the ECAM printhead 500 and the busbar 80 itself.

Referring to FIGS. 5A and 5B, in some examples, the ECAM printhead 500 further comprises a set of flexible ribbon cables 540 interconnecting the electrode-array drivers 530 with the control board 700. For example, the ECAM printhead 500 may comprise flexible ribbon cable connectors 542 to which these flexible ribbon cables 540 are connected to. The set of flexible ribbon cables 540 and the electrode-array drivers 530 are positioned within the sealed assembly cavity 210. In some examples, the set of flexible ribbon cables 540 and/or the electrode-array drivers 530 are provided on the control board 700 (rather than being parts of the ECAM printhead 500). The ECAM printhead 500 also comprises a surface printhead power connector or connectors 550, which connect to each electrode in the electrode array 510 and may also be coupled to the power supply 104 through control board power connector 750, the busbar 800, or other means.

Referring to FIG. 5A, in some examples, the ECAM printhead 500 comprises a set of printhead aligning features 590, e.g., printed or otherwise arranged on the first printhead side 501. These printhead aligning features 590 may be used for precisely aligning the ECAM printhead 500 relative to the cover 400 (which comprises its own set of cover-aligning features 490). The printhead aligning features 590 are aligned with respect to the electrode array 510. As such, the edges of the ECAM printhead 500 do not need to be precisely aligned relative to the electrode array 510, which simplifies fabricating of the ECAM printhead 500 (e.g., cutting from a large substrate comprising multiple electrode arrays 510, used to form multiple ECAM printheads 500 by cutting this substrate).

Referring to FIG. 3D, in some examples, the support unit 600 directly interfaces the second printhead side 502 and is sealed against the base recessed support gasket 324. The base 300, the cover 400, the ECAM printhead 500, and the support unit 600 may collectively form a sealed assembly cavity 210. The sealed assembly cavity 210 can be maintained under a reduced pressure, e.g., to force the ECAM printhead 500 flat against the support unit 600 thereby ensuring rigid and square support for the ECAM printhead 500. For example, the ECAM printhead 500 may comprise a glass base (which is fragile) forming the second printhead side 502 and directly interfacing the support unit 600. Furthermore, the sealed assembly cavity 210 may house various internal components of the modular cartridge assembly 200 and isolate these components from the electrolyte, provided at least over the ECAM printhead 500 during the operation of the modular cartridge assembly 200.

Figure 6A:
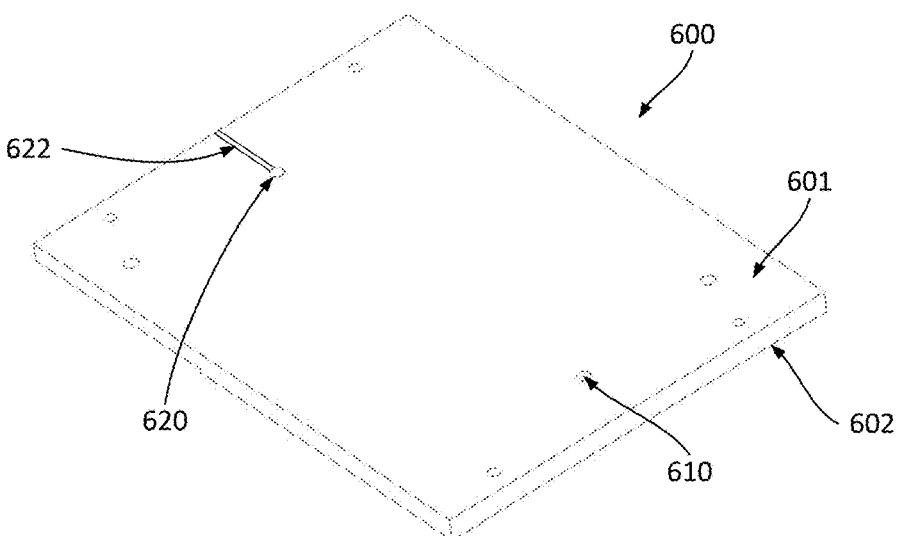
FIGS. 6A and 6B are schematic top and bottom perspective views of the support unit of the modular cartridge assembly in FIGS. 2A and 2B illustrating a support unit primary opening and a support unit leak detection opening, in accordance with some examples.
Figure 6B:
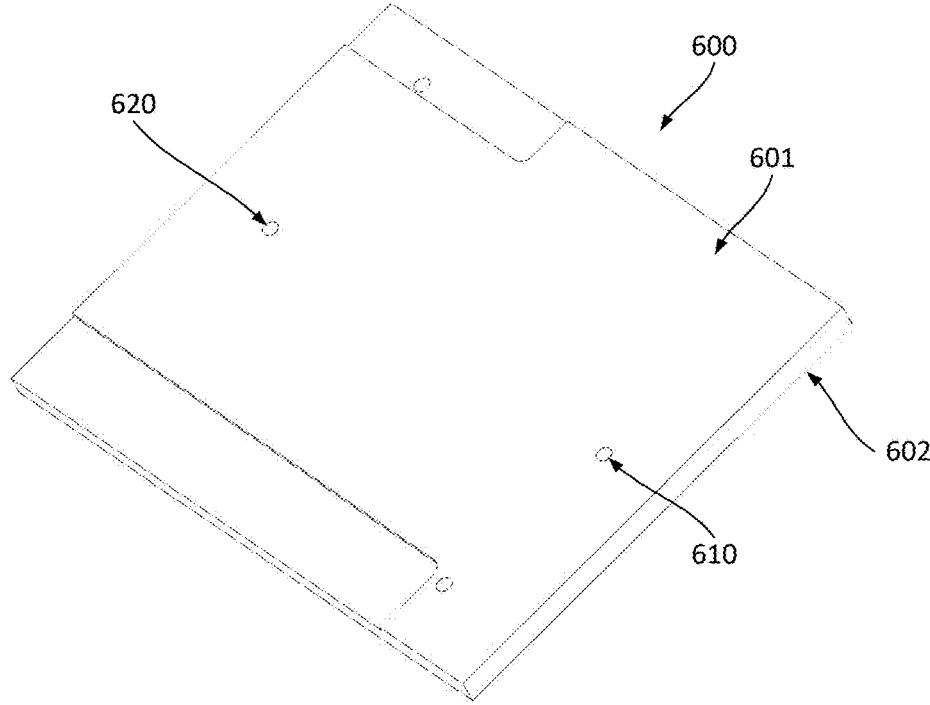

Referring to FIGS. 6A and 6B, in some examples, the support unit 600 is formed from a metal, e.g., aluminum. The metal provides thermal conductivity between the ECAM printhead 500 and the modular-cartridge-assembly support 1000 or, more specifically, the assembly support thermal plate 1100, which may be actively cooled. This thermal management aspect allows operating the ECAM printhead 500 at high currents that correspond to significant resistive heating. Furthermore, the metal surface of the support unit 600, which interfaces and supports the ECAM printhead 500, can be made substantially planar (e.g., the surface deviation from a virtual plate is less than 1 millimeter) to provide uniform support to the ECAM printhead 500 and to ensure the thermal coupling (and thermal transfer) between the ECAM printhead 500 and the support unit 600.

In some examples, an aluminum metal of the support unit 600 comprises a high-phosphorous nickel coating. High phosphorus nickel plating coating may be used because it protects aluminum components against the copper solution. Aluminum is used because it is cost effective and gives a good stiffness to weight ratio. Other examples of base metal and coating are within the scope.

Referring to FIGS. 6A and 6B, in some examples, the support unit 600 comprises a support-unit first side 601 and a support-unit second side 602, opposite of the support-unit first side 601. The support-unit first side 601 directly interfaces with the second printhead side 502. The support-unit first side 601 and the support-unit first side 601 are substantially parallel to each other. For purposes of this disclosure, the term "substantially parallel" is defined as the thickness of the support unit 600, defined as the distance between the support-unit first side 601 and the support-unit second side 602, deviating less than 1 millimeter over a 1-meter distance on average.

Referring to FIGS. 6A and 6B, in some examples, the support unit 600 comprises a support unit primary opening 610 extending through the support unit 600 between the support-unit first side 601 and the support-unit second side 602 and fluidically coupled to the sealed assembly cavity 210. The support unit primary opening 610 is used to reduce the pressure inside the sealed assembly cavity 210, e.g., to force the ECAM printhead 500 against the support unit 600 thereby ensuring the support for the ECAM printhead 500. As further described below, when the modular cartridge assembly 200 is installed on the modular-cartridge-assembly support 1000, the support unit primary opening 610 is aligned with and fluidically coupled with the assembly support primary opening 1110, which interconnects this support unit primary opening 610 with a vacuum source (e.g., a vacuum pump).

Referring to FIGS. 6A and 6B, in some examples, the support unit 600 further comprises a support unit leak detection opening 620 extending through the support unit 600 between the support-unit first side 601 and the support-unit second side 602 and fluidically coupled to the sealed assembly cavity 210. Furthermore, the support unit 600 may comprise a support-unit leak-detection groove 622 on the support-unit first side 601 and extend between the support unit leak detection opening 620 and an edge of the support unit 600. The support unit leak detection opening 620 may be fluidically connected to a pressure sensor to monitor the pressure inside the sealed assembly cavity 210. The pressure sensing is used to determine that the modular cartridge assembly 200 is fully sealed (e.g., that there are no leaks from the environment to the sealed assembly cavity 210) and ready for operation (e.g., ready for flowing the electrolyte over the electrode array 510). The support-unit leak-detection groove 622 is used to ensure adequate connection between the sealed assembly cavity 210 and the support unit leak detection opening 620 (i.e., to prevent blockage by the ECAM printhead 500 and to fluidically separate the support unit primary opening 610 and the support unit leak detection opening 620).

The control board 700 may be also referred to as a control interconnect board. The control board 700 is connected to the ECAM printhead 500 (e.g., using a set of flexible ribbon cables 540) and provides control signals for activating electrodes in the electrode array 510 by controlling the corresponding electrode-array drivers 530. In some examples, the control board 700 comprises various interface processors/chips for controlling the operation of the ECAM printhead 500. For example, row and column drivers/IO processors/chips may be installed instead of, or in addition to, the electrode-array drivers 530 on the ECAM printhead 500. The signal connections are made between the control board 700 and the ECAM printhead 500 using, e.g., a set of flexible ribbon cables 540 (such as high-density flexible cables), which may be parts of the ECAM printhead 500 or parts of the control board 700.

Figure 7A:
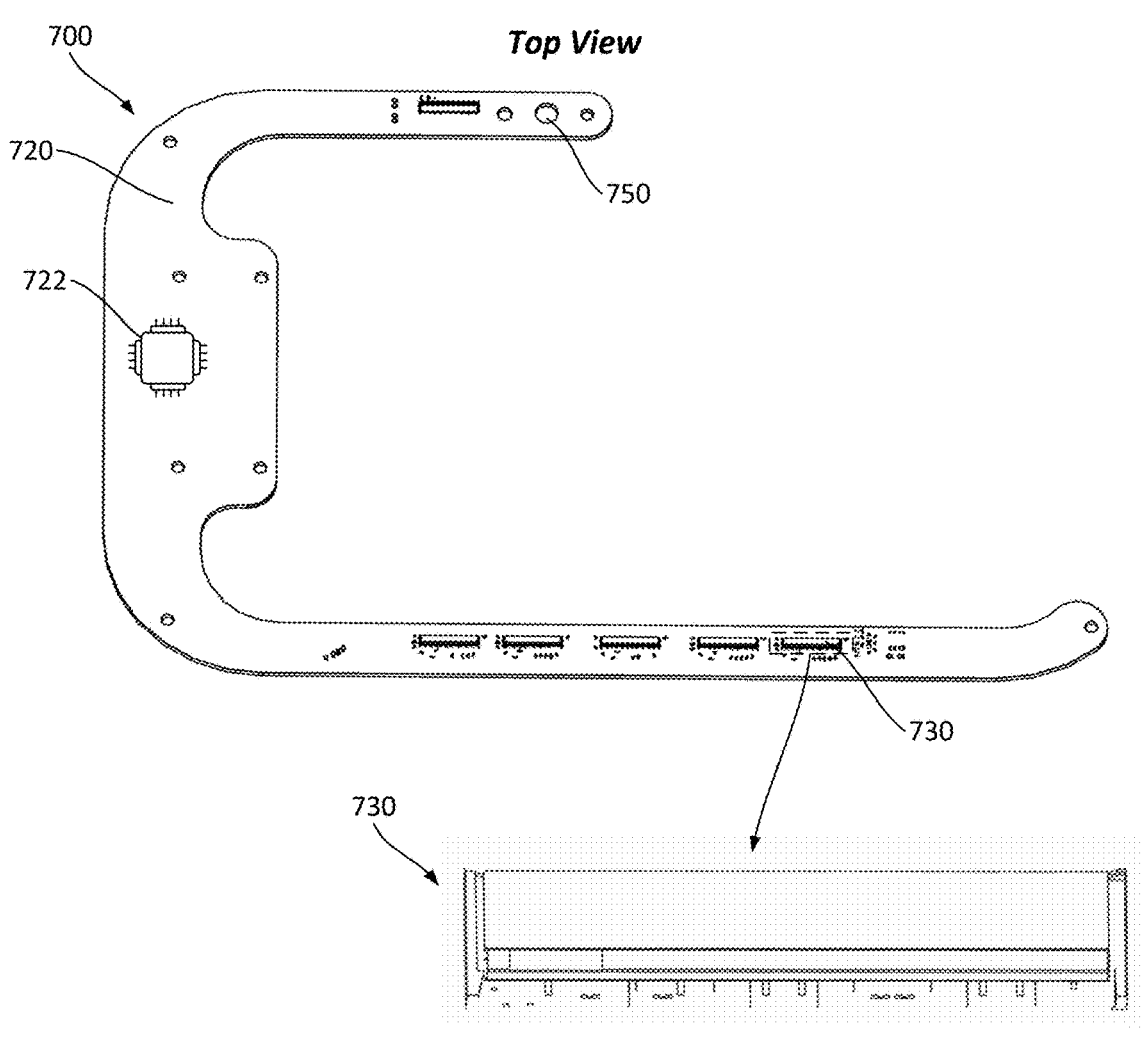
FIGS. 7A and 7B are schematic top and bottom perspective views of the control board of the modular cartridge assembly in FIGS. 2A and 2B illustrating a set of control board printhead connectors, control board external connector, and control board power connector, in accordance with some examples.
Figure 7B:
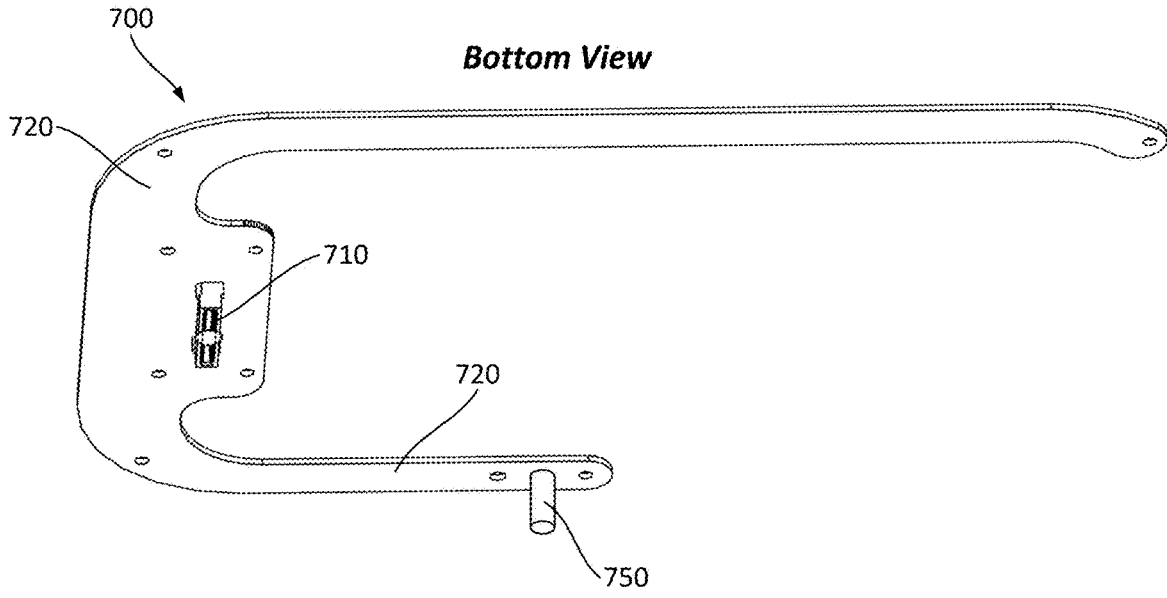

Referring to FIGS. 7A and 7B, in some examples, the control board 700 comprises a control board external connector 710 and a control board main portion 720. The control board external connector 710 protrudes through and is sealed against the base 300. For example, the base 300 may comprise a base signal connector opening 330 such that the inner surface (forming this base signal connector opening 330) is sealed against the control board external connector 710. As shown in FIGS. 3A-3B, the base signal connector opening 330 may be positioned between two base attachment openings 350.

In some examples, the control board main portion 720 is electrically coupled to the ECAM printhead 500 and is positioned within the sealed assembly cavity 210. For example, the control board 700 comprises a set of control board printhead connectors 730, each connected to the control board external connector 710, e.g., using various conductive traces provided in the control board main portion 720. For example, the control board main portion 720 may be in the form of a printed circuit board (PCB) providing various signal connections, and in some examples, power connections.

In some examples, auxiliary power signals are also provided by the control board external connector 710, a control board power connector 750, or the like. Such auxiliary power signals may be used in addition to or instead of the busbar 800.to form a power connection to a power supply such as the deposition power supply 104. Such auxiliary power connections may be used, in some examples, to troubleshoot and/or test the ECAM printhead 500 and the control board 700, e.g., before attaching the busbar 800.

In some examples, the control board 700 is used to selectively activate a subset of electrodes in the electrode array 510, e.g., through signals passed from the control board external connector 710 to the set of control board printhead connectors 730 (through the control board main portion 720) and then to the electrode-array drivers 530 (thorough the set of flexible ribbon cables 540 connected to the set of control board printhead connectors 730). In some examples, some of these control functions are performed using a processor 722 and/or sensor(s) positioned on the control board main portion 720, which may serve to shorten the electrical path to the printhead and/or reduce noise and/or mapping the ECAM printhead 500.

In some examples, the control board 700 is configured for mapping using the ECAM printhead 500 during operation of the modular cartridge assembly 200 at a time when the busbar 800 has been electrically disconnected. For example, an auxiliary power connection (control board power connector 750, control board external connector 710, etc.) may be used to apply a voltage to the electrode array 510 while measuring the current through an electrode using the electrode-array drivers 530 of the ECAM printhead 500. Other mapping examples (e.g., measuring capacitance) are also within the scope. This mapping operation may be used to determine the profile of the deposited material 155 (e.g., relative to the electrode array 510), printhead electrode state, electrolyte condition, and the like. The busbar 800 may be disconnected from the power supply, e.g., the cable connected to the busbar external connector 810 may be electrically disconnected. It should be noted that such cables (e.g., connected to the busbar external connector 810 and used to flow high currents during the deposition of the material 155) may generate significant noise (e.g. operate as antennas during the mapping operation). Therefore, disconnecting/removing such cables (and therefore bypassing the busbar 800) may improve the mapping quality. The current-carrying component during this mapping operation is an auxiliary power connection such as the control board power connector 750, control board external connector 710, etc.

In some examples, a mapping process comprises a map of desired current output from each electrode in an electrode array 510 (or a subset of electrodes), so that this current output will generate a corresponding deposition rate. For example, each deposition cycle may include a target map for the layer and various process parameters. The target map may include a two-dimensional grid showing locations where material is to be deposited. The process parameters for a layer may include any variables that affect the physical or electrical processes that construct the layer. These parameters may include for example, without limitation, current density range, voltage range, layer height, movement parameters, overhang controls, safety thresholds, leakage thresholds, short circuit determination threshold values, pixel mapping intervals and thresholds, debubble values, fusing, anode cleaning, islanding, distance to short, distance to short percentage, pixel limits, slow current control values, and maximum blob size. Various sensors may be used as a part of the ECAM printhead 500 and/or the control board 700 to monitor one or more of these process parameters.

The busbar 800 may be also referred to as a power supply board. When present, the busbar 800 connects to a power supply, e.g., through the assembly support power connector 1020. Multiple connections to the ECAM printhead 500 may be made using a set of busbar printhead connectors 830, e.g., flexible/"spring loaded" connections such as leaf springs, pogo pins, flexible conductive gaskets (such as used for EMI/RFI shielding), etc. These busbar printhead connectors 830 correspond to power supply pads on the ECAM printhead 500. The busbar external connector 810 provides a quick-connect/disconnect feature (with the assembly support power connector 1020) when the modular cartridge assembly 200 is installed onto/removed from the modular-cartridge-assembly support 1000. However, many types and shapes of connectors and power supply boards are within the scope. For example, a board of the busbar 800 may completely surround the ECAM printhead 500. Many materials can be used to fabricate these boards, for example, solid copper, printed circuit boards, etc.

Figure 8A:
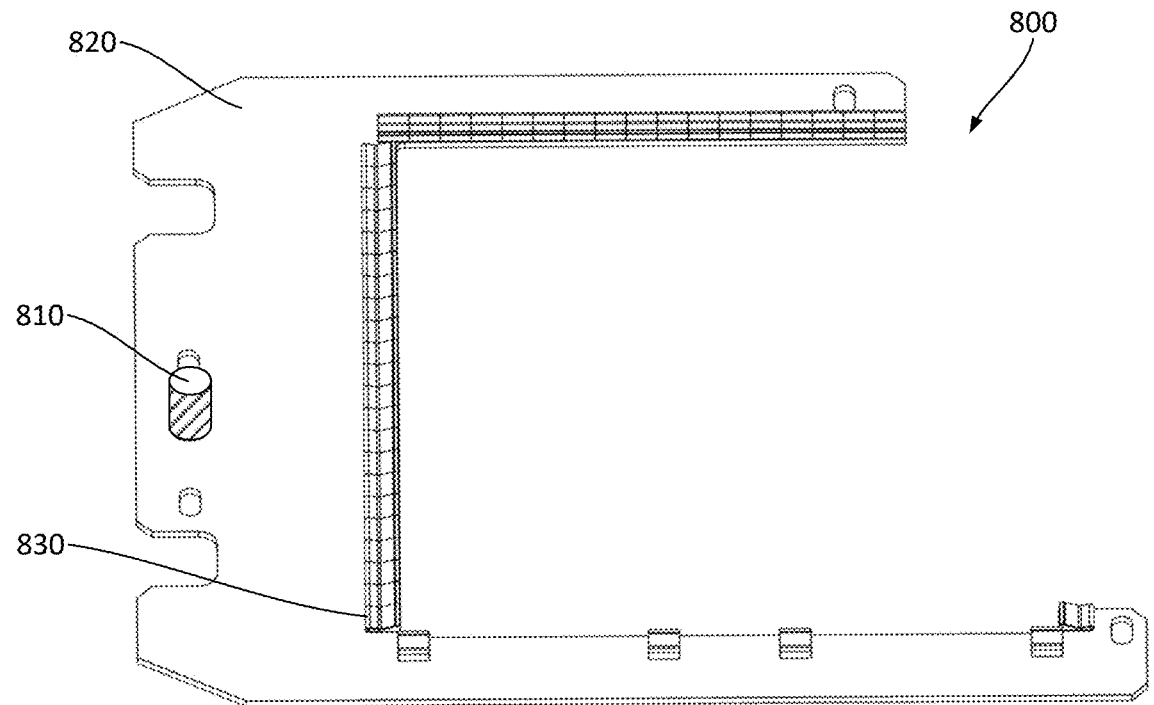
FIG. 8A is a schematic top perspective view of the busbar of the modular cartridge assembly in FIGS. 2A and 2B illustrating a busbar external connector and a set of busbar printhead connectors, in accordance with some examples.
Figure 8B:
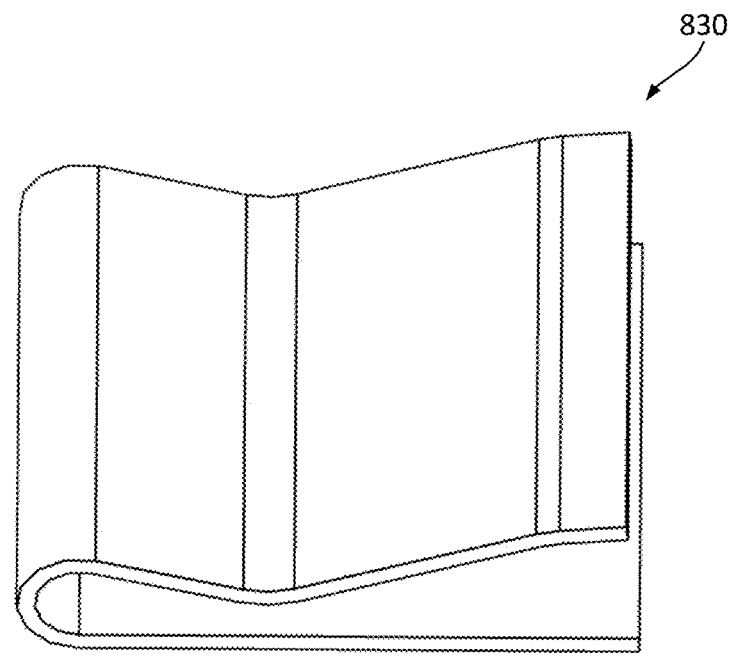
FIG. 8B is a schematic perspective view of a busbar printhead connector, in accordance with some examples.

Referring to FIG. 8A, in some examples, the busbar 800 comprises a busbar external connector 810 and a busbar main portion 820. The busbar external connector 810 protrudes through and is sealed against the base 300, e.g., through a base power connector opening 340. The busbar main portion 820 is electrically coupled to the ECAM printhead 500, e.g., using a set of busbar printhead connectors 830. Specifically, these busbar printhead connectors 830 may interface the contacts of the electrode-array drivers 530. The busbar main portion 820 is configured to deliver current to the subset of electrodes in the electrode array 510 selectively activated using the control board 700. The busbar main portion 820 is positioned within the sealed assembly cavity 210. Referring to FIG. 8B, in some examples, a busbar printhead connector 830 is a set of spring contacts extending away from the busbar main portion 820 and compressibly engaging printhead connection 550.

Examples of ECAM Methods

Figure 9:
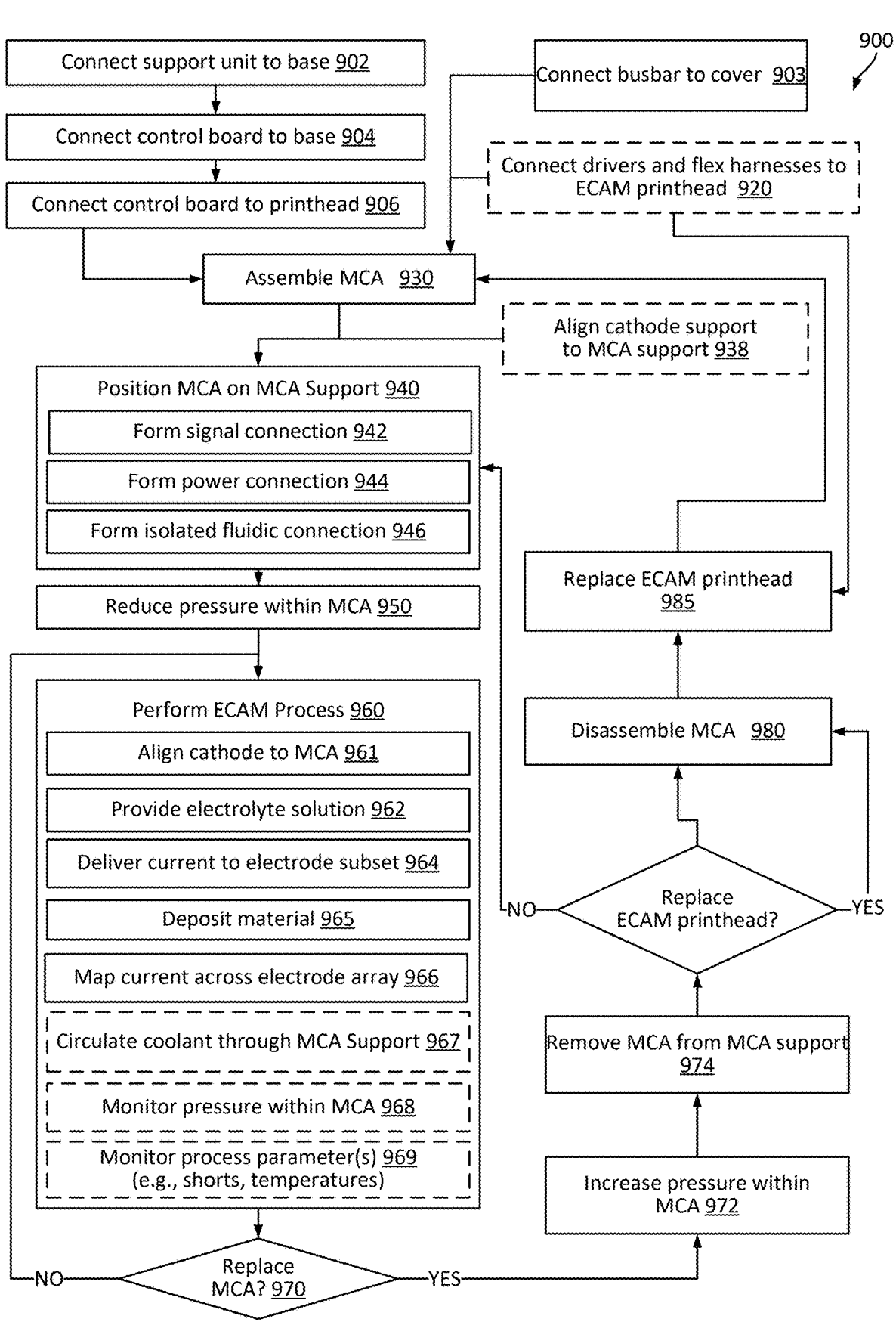
FIG. 9 is a process flowchart corresponding to a method for electrochemical additive manufacturing using an ECAM system equipped with a modular cartridge assembly, in accordance with some examples.

FIG. 9 is a process flowchart corresponding to method 900 of electrochemical additive manufacturing (ECAM), in accordance with some examples. Various operations of this method 900 are performed using an ECAM system 100 and, more specifically, a modular cartridge assembly 200 various examples of which are described above.

In some examples, method 900 comprises (block/operation 902) connecting the support unit 600 to the base 300, e.g., by inserting the support unit 600 into a portion of the base opening 309 and onto the base recess support 320. A base recessed support gasket 324 may be provided for sealing these components. The support unit 600 may be eventually compressed between the base 300 and cover 400 or, more specifically, between the ECAM printhead 500 and base 300 when the modular cartridge assembly 200 is finally assembled, e.g., as schematically shown in FIG. 3D.

Returning to FIG. 9, in some examples, method 900 comprises (block/operation 903) connecting a busbar 800 to the cover 400. For example, a set of fasteners may be used to form this connection. In the same or other examples, method 900 further comprises (block/operation 904) connecting a control board 700 to the base 300, e.g., using a set of fasteners. In some examples, an ECAM printhead 500 is positioned into the base opening 309 before or after connecting the control board 700 to the base 300. Method 900 further comprises (block/operation 906) connecting the control board 700 to the ECAM printhead 500. For example, the ECAM printhead 500 comprises electrode-array drivers 530 and a set of flexible ribbon cables 540 soldered to contacts of the ECAM printhead 500. The control board 700 comprises a set of control board printhead connectors 730 such that connecting the control board 700 to the ECAM printhead 500 comprises plugging the set of flexible ribbon cables 540 to the set of control board printhead connectors 730. Other examples of connecting the control board 700 to the ECAM printhead 500 are also within the scope, e.g., with flexible ribbon cables 540 being parts of the control board 700.

Method 900 may comprise (block/operation 930) assembling a modular cartridge assembly 200 or, more specifically, fabricating or refurbishing the modular cartridge assembly 200. During the fabrication, all new components of the modular cartridge assembly 200 may be used. During the refurbishment, a new ECAM printhead 500 may be used while other components may be reused.

During this assembly operation, the base 300 may be inserted into the cover open cavity 414 (defined by interior side wall 412) such that the base edge gasket 314 is sealed against the interior side wall 412, e.g., as shown in FIG. 3D. Furthermore, the set of cover attachment protrusions 450 may be slid into the corresponding set of base attachment openings 350 such that each cover attachment protrusion gasket 454 is sealed against the corresponding base attachment opening sidewall 354. A set of fasteners 290 may be installed to support the base 300 relative to the cover 400, e.g., as shown in FIG. 3E. Furthermore, by forcing the base 300 against the cover 400, these fasteners 290 compress various gaskets and form various seals (e.g., a cover opening gasket 424 sealing the interface between the cover 400 and the ECAM printhead 500 and, separately, a base recessed support gasket 324 sealing the interface between the base 300 and the support unit 600).

It should be noted that prior to this assembling operation (block/operation 930), the support unit 600 may be positioned in the base opening 309. Furthermore, the control board 700 may be attached to the base 300, and the set of flexible ribbon cables 540 of the ECAM printhead 500 may be connected to the control board 700. Similarly, the busbar 800 may be connected to the cover 400. In some examples, (block/operation 930) assembling the modular cartridge assembly 200 comprises compressing the cover opening gasket 424 against the edge portion 520 of the ECAM printhead 500. These subassembly operations are described above.

In some examples, method 900 further comprises, prior to (block/operation 940) positioning the modular cartridge assembly 200 on the modular-cartridge-assembly support 1000, (block/operation 938) aligning the modular-cartridge-assembly support 1000 relative to the cathode or, more generally, the deposition electrode 150. This operation aligns these two components, which helps to align the modular cartridge assembly 200 (later positioned on the modular-cartridge-assembly support 1000) relative to the cathode. More specifically, this feature helps to align the electrode array 510 relatively to the cathode without direct contact between the two parts (since the contact may be damaging to the electrode array 510).

Figure 10A:
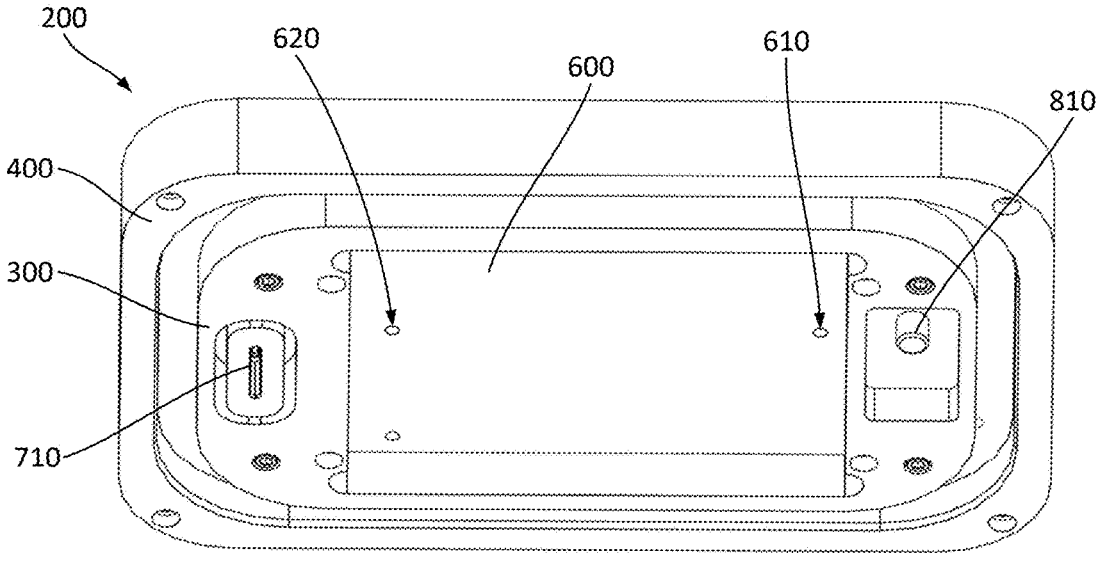
FIG. 10A is a schematic perspective bottom view of a modular cartridge assembly support unit, in accordance with some examples.
Figure 10B:
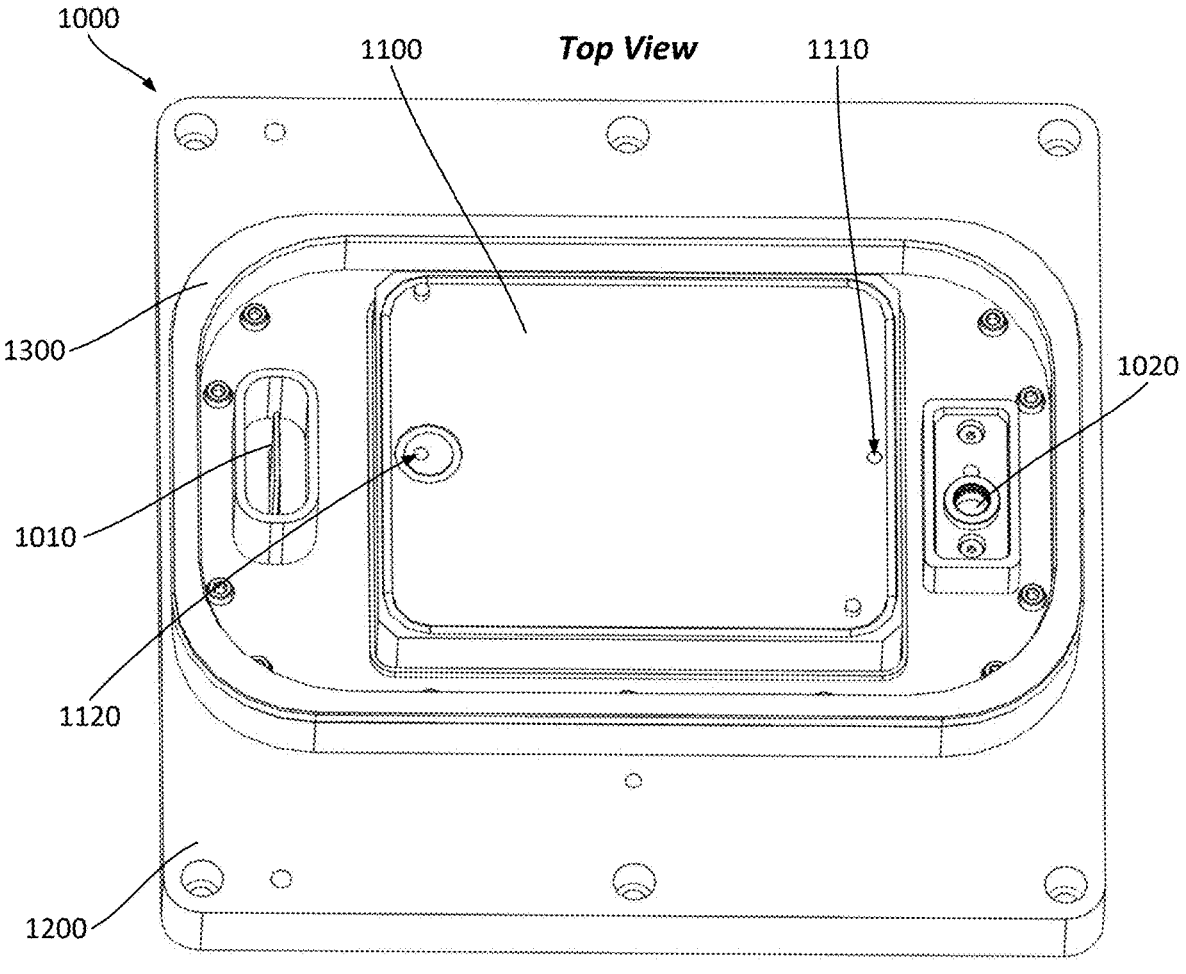
FIG. 10B is a schematic perspective top view of a modular-cartridge-assembly support unit prior to attaching the modular cartridge assembly in FIG. 10A, in accordance with some examples.
Figure 10C:
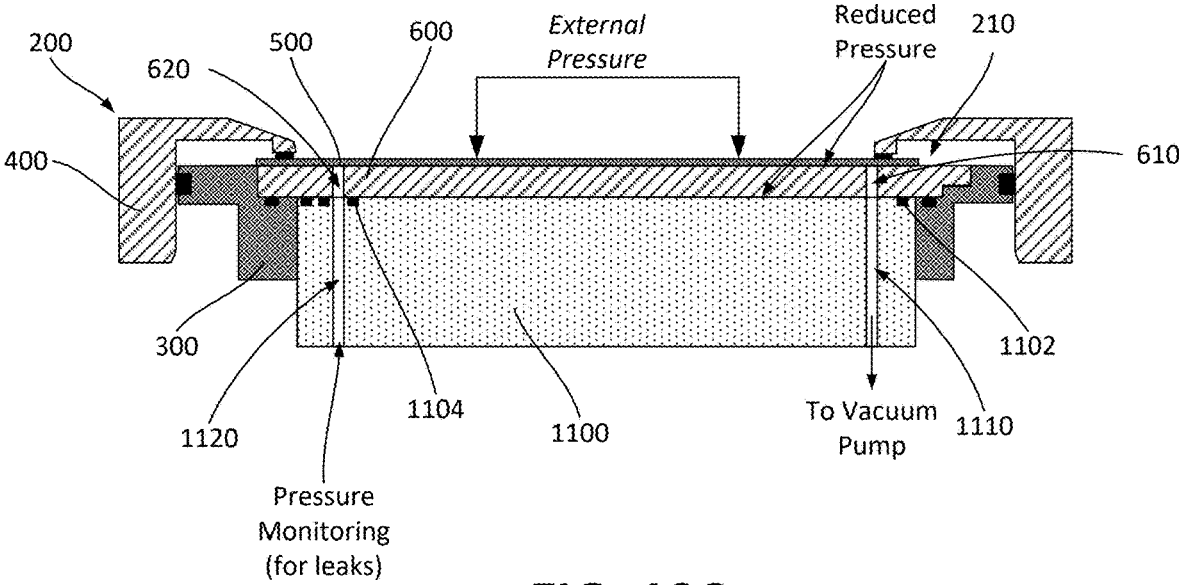
FIG. 10C is a schematic cross-sectional view of the modular cartridge assembly in FIG. 10A attached to, supported by, and sealed against the modular-cartridge-assembly support unit in FIG. 10B, in accordance with some examples.
Figure 11A:
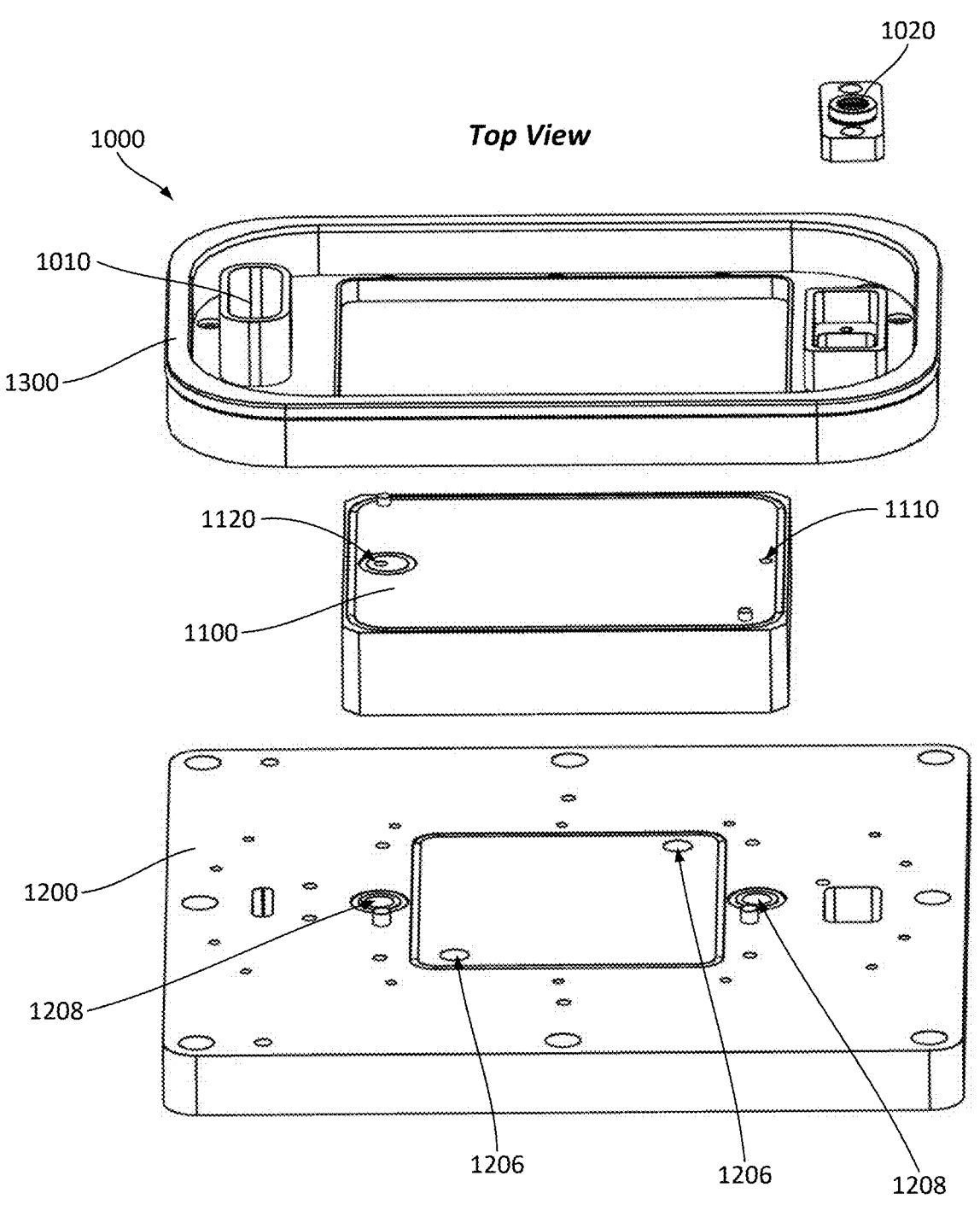
FIGS. 11A and 11B are exploded views of a modular-cartridge-assembly support unit, in accordance with some examples.
Figure 11B:
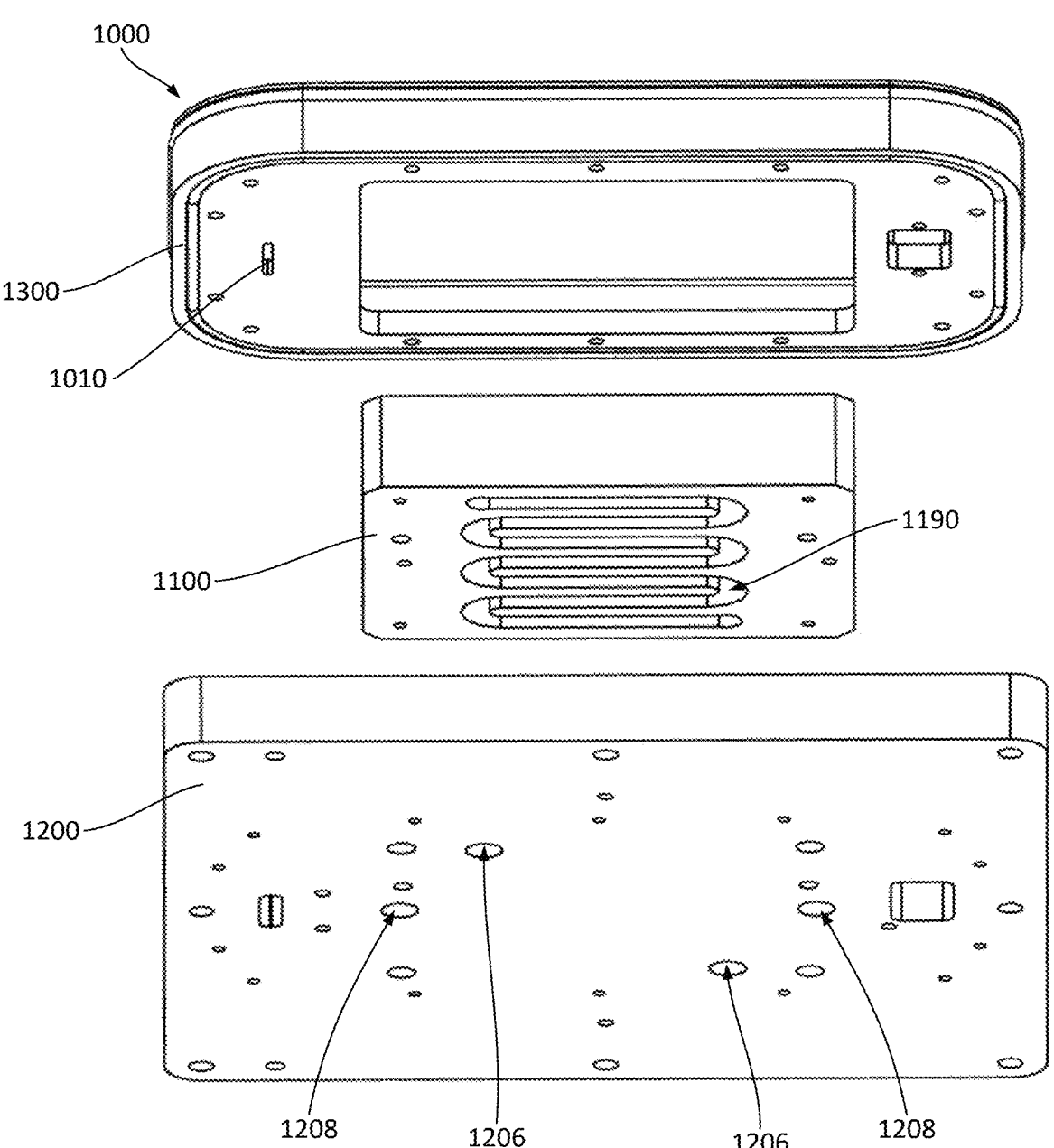

The method 900 may proceed with (block/operation 940) positioning the modular cartridge assembly 200 on a modular-cartridge-assembly support 1000. An example of the modular cartridge assembly 200 is shown in FIG. 10A, while a corresponding example of the modular-cartridge-assembly support 1000 is shown in FIG. 10B. Additional features of the modular-cartridge-assembly support 1000 are shown in FIGS. 11A and 11B. A combination of the modular cartridge assembly 200 and the modular-cartridge-assembly support 1000 after completing the positing operation is shown in FIG. 10C.

Specifically, the modular-cartridge-assembly support 1000 comprises an assembly support thermal plate 1100, an assembly support signal connector 1010, and an assembly support power connector 1020, e.g., as shown in FIGS. 11A and 11B. The assembly support thermal plate 1100 may be attached to and supported by an assembly support base plate 1200. Furthermore, the modular-cartridge-assembly support 1000 may comprise an assembly support cover 1300, which surrounds the assembly support thermal plate 1100 and is attached to the assembly support base plate 1200. The assembly support cover 1300 may be used for alignment of the modular cartridge assembly 200 when positioned on the assembly support thermal plate 1100. The support of the modular cartridge assembly 200 relative to the assembly support thermal plate 1100 may be provided by a reduced pressure that is formed between the assembly support thermal plate 1100 and the modular cartridge assembly 200, which forces the modular cartridge assembly 200 or, more specifically, the support unit 600 against the assembly support thermal plate 1100. The assembly support cover 1300 may also support an assembly support signal connector 1010 and an assembly support power connector 1020.

In some examples, the assembly support thermal plate 1100 comprises an assembly support primary opening 1110 and an assembly support leak detection opening 1120 which are aligned and fludically coupled with corresponding base plate gas ports 1208 of the assembly support base plate 1200. Furthermore, the assembly support base plate 1200 may comprise base plate cooling ports 1206, which are aligned and fluidically coupled with the ends of a thermal plate fluid channel 1190 shown in FIG. 11B. These base plate cooling ports 1206 allow the colling fluid in and out of the thermal plate fluid channel 1190 for cooling the the assembly support thermal plate 1100, which in turn is thermally coupled by the support unit 600 to the ECAM printhead 500.

The base plate cooling ports 1206 and thermal plate fluid channel 1190 are used to circulate coolant (e.g., chilled water) through the assembly support thermal plate 1100 thereby removing the heat received by the assembly support thermal plate 1100 from the modular cartridge assembly 200. This heat may be generated at the ECAM printhead 500 (e.g., due to the resistive heating) and transferred to the assembly support thermal plate 1100 by the support unit 600. It should be noted that in many examples, the temperature of the ECAM printhead 500 may be maintained at a consistent level for many reasons. Consistent temperature may keep parts of the printer from expanding and/or contracting, may prevent damage to the ECAM printhead 500 (and other components of the modular cartridge assembly 200) as well as prevent various negative effects on the electrolyte (e.g., boiling, decomposition, side reactions, etc.).

After this positioning operation, the assembly support signal connector 1010 is connected to the control board 700 of the modular cartridge assembly 200 or, more specifically, to the control board external connector 710. Furthermore, the assembly support power connector 1020 is connected to the busbar 800 of the modular cartridge assembly 200 or, more specifically, to the busbar external connector 810 (when the busbar 800 is present). Finally, the assembly support thermal plate 1100 directly interfaces (for mechanical alignment and thermal coupling) and is sealed against the support unit 600 of the modular cartridge assembly 200. The direct interface between the assembly support thermal plate 1100 and the support unit 600 ensures the alignment of the ECAM printhead 500 or, more specifically, of the electrode array 510 relative to the assembly support thermal plate 1100 and therefore to the cathode (since the assembly support thermal plate 1100 is already aligned relative to the cathode).

In some examples, (block/operation 940) positioning the modular cartridge assembly 200 on a modular-cartridge-assembly support 1000 comprises (block/operation 942) plugging the control board external connector 710 into the assembly support signal connector 1010 thereby forming a signal connection, (block/operation 944) plugging the busbar external connector 810 into assembly support power connector 1020 thereby forming an electrical connection, and (block/operation 946) forming an isolated fluidic connection between the sealed assembly cavity 210 and a vacuum source connected to the ECAM system modular-cartridge-assembly support 1000. These operations may be performed simultaneously as a part of the overall installation and aligning of all connectors and fluidic paths.

Method 900 also comprises (block/operation 950) reducing pressure within the sealed assembly cavity 210 of the modular cartridge assembly 200 thereby forcing the ECAM printhead 500 against the support unit 600 and also forcing the support unit 600 against the assembly support thermal plate 1100. In some examples, the pressure is reduced to −13 PSI with acceptable levels better than −11 PSI.

For example, the support unit 600 may comprise a support unit primary opening 610 extending through the support unit 600 and fluidically coupled to the sealed assembly cavity 210, e.g., as shown in FIG. 10C. The assembly support thermal plate 1100 comprises an assembly support primary opening 1110 extending through the assembly support thermal plate 1100 and fluidically coupled with the support unit primary opening 610 as well as to a vacuum source. In these examples, (block/operation 950) reducing pressure within the sealed assembly cavity 210 comprises flowing gas from the sealed assembly cavity 210 to the vacuum source through the support unit primary opening 610 and the assembly support primary opening 1110.

In some examples, the assembly support thermal plate 1100 comprises a thermal plate primary gasket 1102 sealing the support unit 600 relative to the assembly support thermal plate 1100 such that the support unit primary opening 610 and the assembly support primary opening 1110 are positioned within a boundary of the thermal plate primary gasket 1102. In these examples, (block/operation 950) reducing the pressure within the sealed assembly cavity 210 also reduces pressure between the assembly support thermal plate 1100 and the support unit 600 within the boundary of the thermal plate primary gasket 1102.

In some examples, the support unit 600 further comprises a support unit leak detection opening 620 extending through the support unit 600 and fluidically coupled to the sealed assembly cavity 210. The assembly support thermal plate 1100 comprises an assembly support leak detection opening 1120 extending through the assembly support thermal plate 1100 and fluidically coupled with the support unit leak detection opening 620 as well as to a pressure sensor. In these examples, each of (block/operation 950) reducing pressure within the sealed assembly cavity 210 and (block/operation 960) performing the electrochemical additive manufacturing comprises monitoring the pressure in the sealed assembly cavity 210 using the pressure sensor.

In some examples, the assembly support thermal plate 1100 comprises a leak detection port gasket 1104 sealing the support unit 600 relative to the assembly support thermal plate 1100 such that the support unit leak detection opening 620 and the assembly support leak detection opening 1120 are positioned within a boundary of the leak detection port gasket 1104. More specifically, the leak detection port gasket 1104 may be positioned within the boundary of the thermal plate primary gasket 1102.

Method 900 further comprises (block/operation 960) performing the electrochemical additive manufacturing. This ECAM operation may comprise (block/operation 961) aligning the cathode to the modular cartridge assembly 200, e.g., using the previous alignment of the modular-cartridge-assembly support 1000 and cathode as a reference. This ECAM operation may comprise (block/operation 962) providing an electrolyte solution 180 between and in contact with the electrode array 510 of the ECAM printhead 500 and a cathode and (block/operation 964) delivering a current to a subset of electrodes in the electrode array 510. In some examples, the current delivered to the subset of electrodes in the electrode array 510 is at least 1 A/cm2 or even at least 10 A/cm2. This current or, more specifically, this current density is needed to ensure a sufficient electroplating rate. However, this current can also cause resistive heating of various components in the ECAM printhead 500 and, more generally, of the modular cartridge assembly 200.

These two steps result in (block/operation 965) depositing a material from the electrolyte onto a portion of the cathode aligned with the subset of electrodes in the electrode array 510. Some aspects of this deposition operation are described above with reference to FIGS. 1C and 1D.

In some examples, (block/operation 960) performing the electrochemical additive manufacturing further comprises (block/operation 966) mapping the electrode array 510 thereby generating a current map. This current map may be used as feedback in further deposition operations (block/operation 965). For example, this current map may be processed using morphological analysis or Boolean operations to determine the deposition extent of the material 155 or, more specifically, at different areas of the material 155 (with different areas corresponding to different portions of the electrode array 510). Feedback data may be used to determine when the deposition (e.g., the deposition of each layer during each deposition cycle) is complete, and to adjust process parameters such as currents and voltages during the deposition. For example, a layer desired configuration may be preprocessed to generate a target deposition current map, to manipulate the material density, and/or to manage various features of the material 155 such as overhangs. Feedback signals may also trigger execution of maintenance (e.g., replacement of the ECAM printhead 500 as further described below with reference to the decision block 970).

In more specific examples, the mapping operation (block/operation 966) is performed using a control board 700 or, more specifically, a processor 722 of the control board 700. For example, a power connection to the busbar 800 may be disconnected prior to the mapping operation (block/operation 966), while using the control board power connector 750 and/or the control board external connector 710 to supply current through the electrode array 510. As noted elsewhere, disconnecting the busbar 800 allows to reduce RF noise, which may interfere with the mapping process (e.g., characterized by small currents).

In some examples, (block/operation 960) performing the electrochemical additive manufacturing further comprises (block/operation 967) circulating a liquid coolant through the modular-cartridge-assembly support 1000 or, more specifically, through the thermal plate fluid channel 1190 using the base plate cooling ports 1206.

In some examples, (block/operation 960) performing the electrochemical additive manufacturing further comprises (block/operation 968) monitoring the pressure within the modular cartridge assembly 200, e.g., using a pressure gauge attached to the assembly support leak detection opening 1120.

In some examples, (block/operation 960) performing the electrochemical additive manufacturing further comprises (block/operation 969) monitoring one or more process parameters using the electrode array 510 and (block/operation 970) determining when the ECAM printhead 500 needs to be replaced. For example, the pressure monitoring may indicate that there is a leak in the modular cartridge assembly 200, in the modular-cartridge-assembly support 1000, or at the interface of these two components. In either case, an increased internal pressure may not provide sufficient force (generated by the ambient pressure due to the pressure gradient) and may not sufficiently align the ECAM printhead 500 relative to the support unit 600 and to the assembly support thermal plate 1100. In some examples, the current or another electrical characteristic of each electrode in the electrode array 510 may be measured to determine wear and other types of damage in the ECAM printhead 500 (e.g., dissolution of the electrodes, cracks in the supporting insulator, and the like). In some examples, the temperature in one or more points in the modular cartridge assembly 200 and/or the modular-cartridge-assembly support 1000 (e.g., inlet coolant temperature, outlet coolant temperature) may be used to monitor localized heating, overall heat generation and dissipation, and other relevant parameters.

In some examples, method 900 further comprises (block/operation 972) increasing the pressure within the sealed assembly cavity 210 of the modular cartridge assembly 200. This pressure increase removes the force applied to the seals and allows the modular cartridge assembly 200 to be removed from the modular-cartridge-assembly support 1000 and eventually disassembled. Method 900 further comprising (block/operation 974) removing the modular cartridge assembly 200 from the modular-cartridge-assembly support 1000 and (block/operation 980) disassembling the modular cartridge assembly 200. The disassembly of the modular cartridge assembly 200 may be used for refurbishing this assembly, e.g., replacing its ECAM printhead 500 (block/operation 985). It should be noted that a replacement ECAM printhead 500 may be processed to (block/operation 920) connect a set of flexible ribbon cables 540 and electrode-array drivers 530 prior to assembling the refurbished modular cartridge assembly 200.

Method 900 then proceeds with repeating (block/operation 930) assembling the modular cartridge assembly 200, (block/operation 940) positioning the modular cartridge assembly 200 on a modular-cartridge-assembly support 1000, (block/operation 950) reducing pressure within the sealed assembly cavity 210, and (block/operation 960) perform the electrochemical additive manufacturing.

Conclusion

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered illustrative and not restrictive.

The invention claimed is:

1. A method for electrochemical additive manufacturing, the method comprising:
   assembling a modular cartridge assembly comprising a base, a cover, an ECAM printhead comprising an electrode array, a support unit, a control board external connector, and a busbar external connector;
   positioning the modular cartridge assembly on a modular-cartridge-assembly support comprising an assembly support thermal plate, an assembly support signal connector, and an assembly support power connector, wherein, after positioning the modular cartridge assembly on the modular-cartridge-assembly support:
   the assembly support signal connector is connected to the control board external connector,
   the assembly support power connector is connected to the busbar external connector, and
   the assembly support thermal plate directly interfaces and is sealed against the support unit;
   reducing pressure within a sealed assembly cavity collectively formed by the base, the cover, the ECAM printhead, and the support unit thereby forcing the ECAM printhead against the support unit and also forcing the support unit against the assembly support thermal plate; and performing the electrochemical additive manufacturing by:

providing an electrolyte solution between and in contact with the electrode array of the ECAM printhead and a cathode, delivering a current to a subset of electrodes in the electrode array, and depositing a material from electrolyte onto a portion of the cathode aligned with the subset of electrodes in the electrode array.

2. The method of claim 1, further comprising mapping the electrode array thereby generating a current map, wherein the current map is used as feedback for delivering the current to the subset of electrodes in the electrode array.

3. The method of claim 2, wherein:

the modular cartridge assembly further comprises a control board such that the control board external connector is a part of the control board, and the control board comprises a processor performing mapping of the electrode array.

4. The method of claim 3, wherein:

the control board further comprises a control board power connector, mapping the electrode array comprises flowing a current through the control board power connector.

5. The method of claim 2, wherein mapping the electrode array comprises flowing a current through the control board external connector.

6. The method of claim 2, wherein the busbar external connector is disconnected from a power supply while mapping the electrode array.

7. The method of claim 1, wherein the base comprises a base opening, a base outer edge defining an outer-most boundary of the base and comprising a base edge groove, the base further comprises a base edge gasket at least partially extending into the base edge groove, the cover comprises a cover opening, and assembling the modular cartridge assembly comprises inserting the base into the cover opening such that the base edge gasket interfaces with and is sealed against the cover.

8. The method of claim 7, wherein:

the base comprises a set of base attachment openings extending through the base and forming a base attachment opening sidewall, the cover comprises a set of cover attachment protrusions, each comprising a cover attachment protrusion groove and a cover attachment protrusion gasket at least partially extending into the cover attachment protrusion groove, and assembling the modular cartridge assembly comprises inserting the set of cover attachment protrusions into the set of base attachment openings such that the cover attachment protrusion gasket is sealed against the base attachment opening sidewall.

9. The method of claim 8, wherein assembling the modular cartridge assembly further comprises protruding a set of fasteners into the set of base attachment openings and screwing the set of fasteners into the set of cover attachment protrusions.

10. The method of claim 1, wherein the cover comprises a cover opening, a cover opening groove surrounding the cover opening, and a cover opening gasket at least partially extending into the cover opening groove, the ECAM printhead comprises an electrode array and an edge portion surrounding the electrode array, and assembling the modular cartridge assembly comprises compressing the cover opening gasket against the edge portion of the ECAM printhead.

11. The method of claim 1, further comprising, prior to positioning the modular cartridge assembly on the modular-cartridge-assembly support, aligning the modular-cartridge-assembly support relative to the cathode.

12. The method of claim 1, wherein:

the support unit further comprises a support unit primary opening extending through the support unit and fluidically coupled to the sealed assembly cavity, the assembly support thermal plate comprises an assembly support primary opening extending through the assembly support thermal plate and fluidically coupled with the support unit primary opening as well as to a vacuum source, and reducing pressure within the sealed assembly cavity comprises flowing gas from the sealed assembly cavity to the vacuum source through the support unit primary opening and the assembly support primary opening.

13. The method of claim 12, wherein the assembly support thermal plate comprises a thermal plate primary gasket sealing the support unit relative to the assembly support thermal plate such that the support unit primary opening and the assembly support primary opening are positioned within a boundary of the thermal plate primary gasket.

14. The method of claim 13, wherein reducing pressure within the sealed assembly cavity also reduces pressure between the assembly support thermal plate and the support unit within the boundary of the thermal plate primary gasket.

15. The method of claim 13, wherein:

the support unit further comprises a support unit leak detection opening extending through the support unit and fluidically coupled to the sealed assembly cavity, the assembly support thermal plate comprises an assembly support leak detection opening extending through the assembly support thermal plate and fluidically coupled with the support unit leak detection opening as well as to a pressure sensor, and each of reducing pressure within the sealed assembly cavity and performing the electrochemical additive manufacturing comprises monitoring the pressure in the sealed assembly cavity using the pressure sensor.

16. The method of claim 15, wherein the assembly support thermal plate comprises a leak detection port gasket sealing the support unit relative to the assembly support thermal plate such that the support unit leak detection opening and the assembly support leak detection opening are positioned within a boundary of the leak detection port gasket.

17. The method of claim 16, wherein the leak detection port gasket is positioned within the boundary of the thermal plate primary gasket.

18. The method of claim 1, further comprising, prior to assembling a modular cartridge assembly:

connecting the support unit to the base, and connecting a busbar comprising the busbar external connector to the cover.

19. The method of claim 18, further comprising, after connecting the support unit to the base:

connecting a control board comprising the control board external connector to the base, and connecting the control board to the ECAM printhead.

20. The method of claim 19, wherein:

the ECAM printhead comprises electrode-array drivers and a set of flexible ribbon cables soldered to contacts of the ECAM printhead, the control board comprises a set of control board printhead connectors, and connecting the control board to the ECAM printhead comprises plugging the set of flexible ribbon cables to the set of control board printhead connectors.

21. The method of claim 1, wherein positioning the modular cartridge assembly on a modular-cartridge-assembly support comprises:

plugging the control board external connector into the assembly support signal connector thereby forming a signal connection, plugging the busbar external connector into the assembly support power connector thereby forming an electrical connection, and forming an isolated fluidic connection between the sealed assembly cavity and a vacuum source connected to the modular-cartridge-assembly support.

22. The method of claim 1, wherein performing the electrochemical additive manufacturing further comprises circulating a liquid coolant through the modular-cartridge-assembly support.

23. The method of claim 1, wherein the current delivered to the subset of electrodes in the electrode array is at least 1 A/cm2.

24. The method of claim 1, wherein performing the electrochemical additive manufacturing further comprises monitoring one or more process parameters using the electrode array and determining when the ECAM printhead needs to be replaced.

25. The method of claim 1, further comprising:

increasing the pressure within the sealed assembly cavity of the modular cartridge assembly;

removing the modular cartridge assembly from the modular-cartridge-assembly support;

disassembling the modular cartridge assembly;

replacing the ECAM printhead in the modular cartridge assembly; and repeating assembling the modular cartridge assembly, positioning the modular cartridge assembly on a modular-cartridge-assembly support, reducing pressure within the sealed assembly cavity, and performing the electrochemical additive manufacturing.

* * * * *